(12) United States Patent
Mori et al.

(10) Patent No.: US 8,018,538 B2
(45) Date of Patent: Sep. 13, 2011

(54) TRANSFLECTIVE LIQUID CRYSTAL DISPLAY DEVICE

(75) Inventors: Kenichi Mori, Kanagawa (JP); Michiaki Sakamoto, Kanagawa (JP); Hiroshi Nagai, Kanagawa (JP); Kenichirou Naka, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 827 days.

(21) Appl. No.: 12/099,534

(22) Filed: Apr. 8, 2008

(65) Prior Publication Data
US 2008/0252803 A1 Oct. 16, 2008

(30) Foreign Application Priority Data

Apr. 13, 2007 (JP) ................................. 2007-106510

(51) Int. Cl.
*G02F 1/1343* (2006.01)
*G02F 1/1335* (2006.01)

(52) U.S. Cl. .......................................... 349/38; 349/114

(58) Field of Classification Search .................... 349/38, 349/39, 41, 42, 54, 139, 143, 147, 149, 113, 349/114

See application file for complete search history.

(56) References Cited

U.S. PATENT DOCUMENTS

| 6,879,361 | B2 * | 4/2005 | Moon et al. | 349/114 |
| 7,463,319 | B2 * | 12/2008 | Roh | 349/114 |
| 7,656,483 | B2 * | 2/2010 | Oka et al. | 349/114 |
| 2006/0187386 | A1 * | 8/2006 | Roh | 349/114 |
| 2008/0043160 | A1 * | 2/2008 | Park et al. | 349/38 |
| 2008/0252803 | A1 * | 10/2008 | Mori et al. | 349/38 |
| 2010/0214262 | A1 * | 8/2010 | Ishizaki et al. | 345/174 |

FOREIGN PATENT DOCUMENTS

| JP | 2005-191061 | 6/2005 |
| JP | 2005-189570 A | 7/2005 |

* cited by examiner

*Primary Examiner* — Brian M Healy
(74) *Attorney, Agent, or Firm* — Sughrue Mion, PLLC

(57) ABSTRACT

To increase the aperture ratio of a transflective liquid crystal display device and suppress a light leakage. Provided is a transflective liquid crystal display device that includes: within a unit pixel, a reflective area including a pixel electrode and a common electrode as a pair and a reflector, and a transmissive area including a pixel electrode and a common electrode as a pair; a liquid crystal layer provided to the reflective area and the transmissive area; storage capacitances for the reflective area and the transmissive area provided in a lower layer of the reflector for changing a potential of the pixel electrode by following a potential of the common electrode; and a suppressing device for suppressing a light leakage in the liquid crystal layer when the pixel electrode is affected by a potential of the reflector due to capacitance coupling generated between the reflector and the pixel electrode.

10 Claims, 19 Drawing Sheets

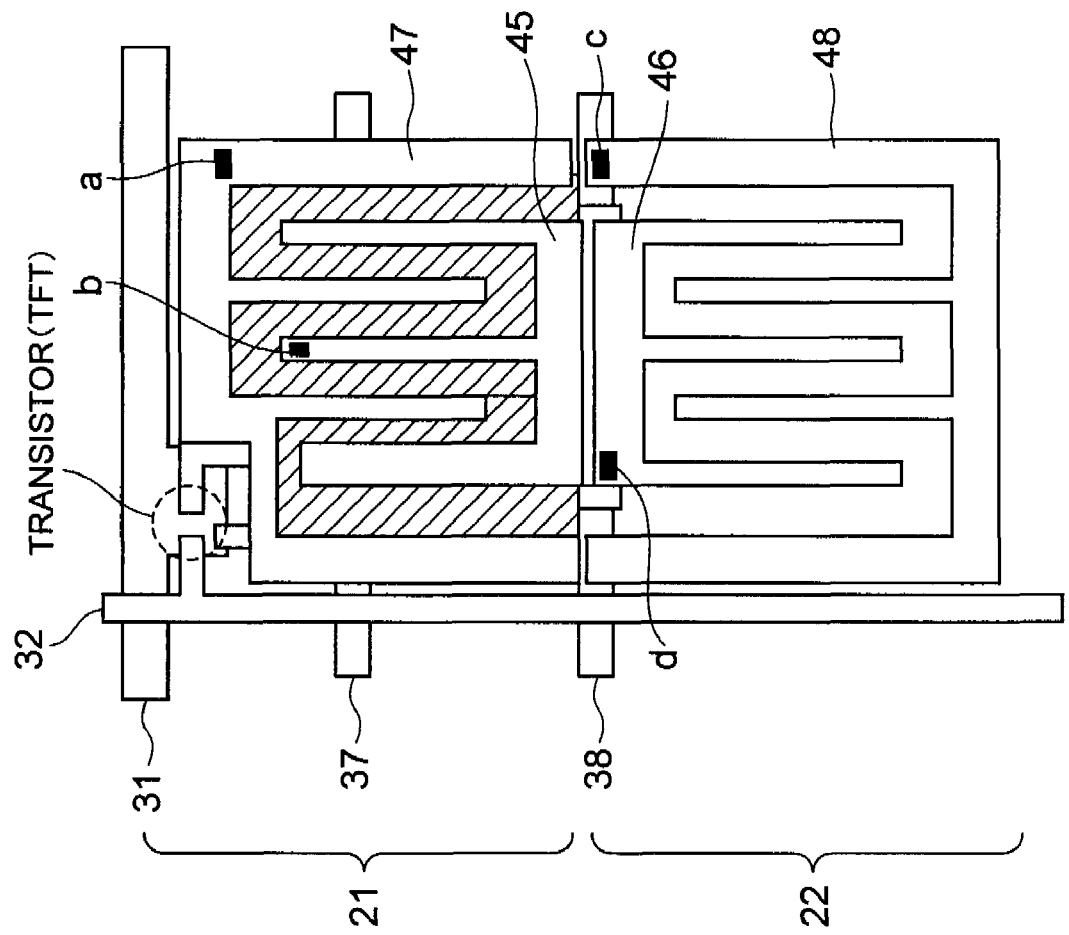

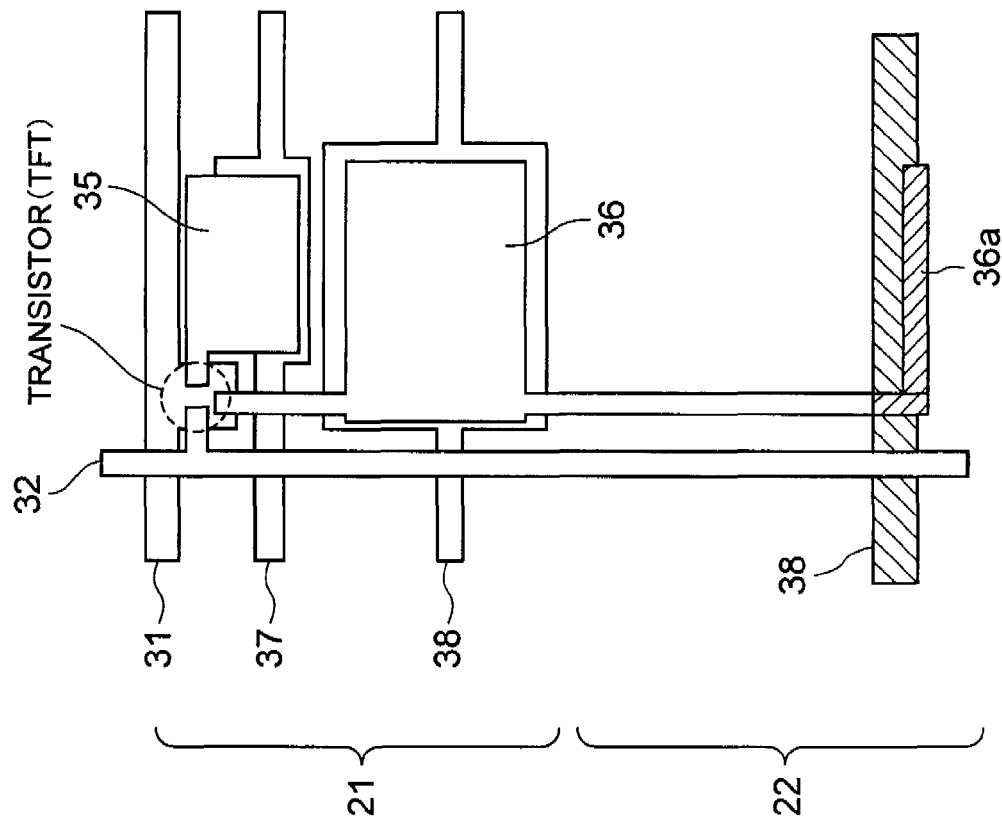

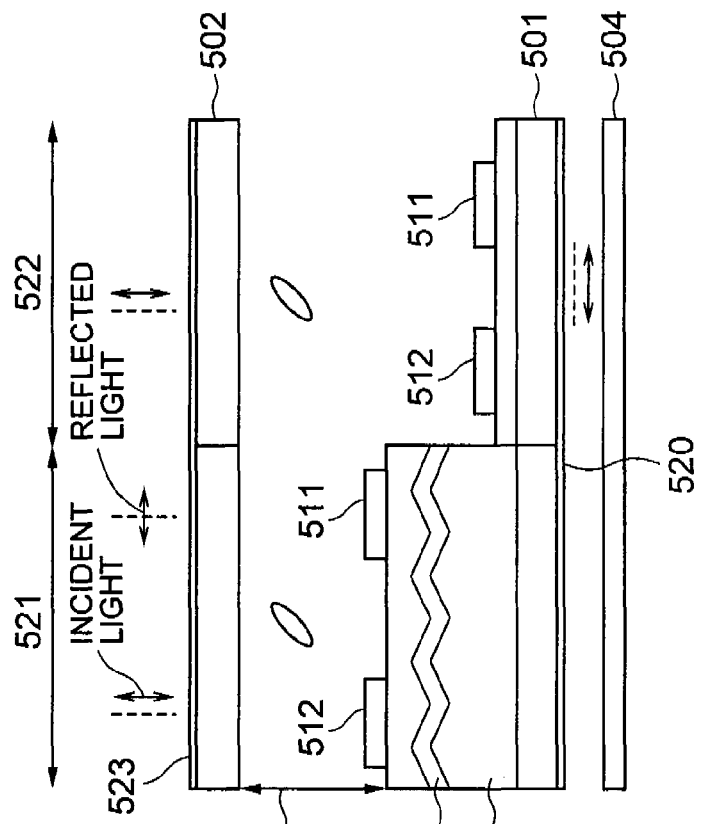
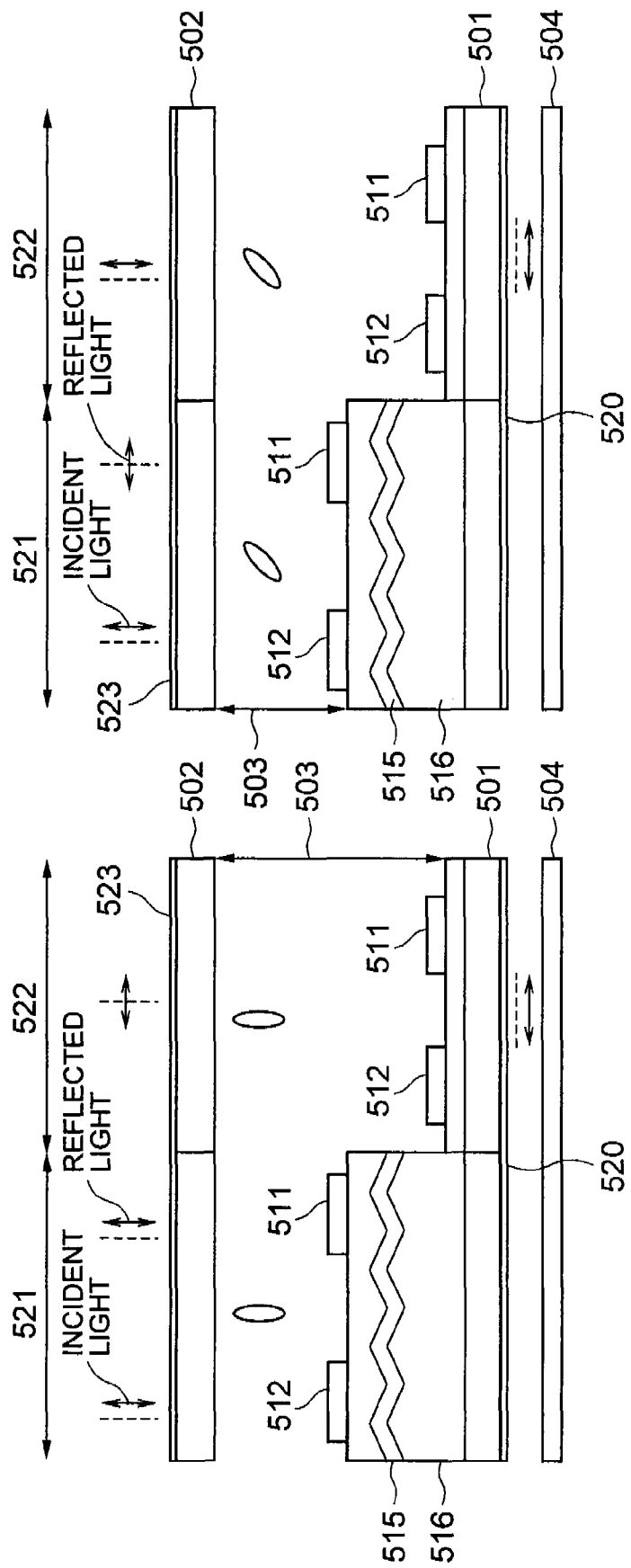

TRANSFLECTIVE LIQUID CRYSTAL DISPLAY DEVICE

CROSS-REFERENCE TO RELATED APPLICATION

This application is based upon and claims the benefit of priority from Japanese patent application No. 2007-106510, filed on Apr. 13, 2007, the disclosure of which is incorporated herein in its entirety by reference.

BACKGROUND OF THE INVENTION

1. Field of the Invention

This invention relates to a liquid crystal display device. More specifically, this invention relates to a liquid crystal display device whose liquid crystals in a display region are driven for display, in which the display region includes both a reflective area for achieving display by reflecting light that makes incident from outside and a transmissive area for achieving display by transmitting light from a rear part.

2. Description of the Related Art

Liquid crystal display devices can be broadly classified into transmissive liquid crystal display devices and reflective liquid crystal display devices. In general, a transmissive liquid crystal display device has a backlight light source, and displays an image by controlling an amount of transmitted light from the backlight light source. A reflective liquid crystal display device has a reflector for reflecting light from outside, and displays an image by utilizing the light reflected by the reflector as a display light source. The reflective liquid crystal display device requires no backlight light source, so that it has an advantage over the transmissive liquid crystal display device in terms of reducing the power consumption, the thickness, and the weight of the device. However, the reflective liquid crystal display device has such a shortcoming that the contrast and visibility become deteriorated under a dark condition, since it uses light in the surroundings as the display light source.

In the meantime, transflective liquid crystal display devices that have advantages of both the transmissive liquid crystal display device and the reflective liquid crystal display device have been put into practical use as displays of portable telephones and mobile terminals. A transflective liquid crystal display device has a transmissive area and a reflective area within a unit pixel. The transmissive area transmits light from a backlight light source, and uses the backlight light source as a display light source. The reflective area has a reflector, and uses external light that is reflected by the reflector as a display light source. With the transflective liquid crystal display device, it is possible to reduce the power consumption by putting out the backlight light source and displaying an image with the reflective areas under a bright condition. Further, it is also possible to display an image even under a dark condition by putting on the backlight light source and displaying an image with the transmissive areas when the surrounding condition turns dark.

Further, as a liquid crystal panel and a liquid crystal display device having a wide range of visible view angles, a transverse electric field mode such as an IPS mode (In-Plane switching) that is generally referred to as a wide view angle liquid crystal panel has been put into practical use. With this IPS-mode liquid crystal panel, liquid crystal molecules are aligned uniaxially by being in parallel to a substrate, and a voltage is applied in parallel to the substrate so as to rotate the liquid crystal molecules while keeping a balanced state with the substrate. That is, the liquid crystal molecules do not rise against the substrate even when the voltage is applied, so that the wide view angles can be obtained theoretically. Further, the IPS-mode liquid crystal display device has a pixel electrode and a common electrode formed on the same substrate, and a lateral electric field is applied to a liquid crystal layer. With the IPS-mode liquid crystal display device, wider view angles than that of a TN-mode liquid crystal display device, for example, can be achieved by displaying an image through rotating the liquid crystal molecules in a direction parallel to the substrate.

When the IPS mode is employed for a related transflective liquid crystal display device, black display and white display are inverted. Thus, if the transmissive area is normally black under a normal driving system, the reflective area becomes normally white.

FIG. 17A and FIG. 17B illustrate schematic sectional views of a unit pixel of the related transflective liquid crystal display device. As shown in FIG. 17A and FIG. 17B, the unit pixel of the transflective liquid crystal display device includes a back-face side substrate 501, a viewer-side substrate 502, and a liquid crystal layer 503 sandwiched between both substrates. The unit pixel includes, in a pixel area, a reflective area 521 for reflecting light from the viewer side, and a transmissive area 522 for transmitting light from the back-face side, and the liquid crystal layer 503 of the reflective area 521 and the transmissive area 522 is driven with a transverse electric field by a voltage that is applied in parallel to the substrate face.

Further, the back-face side substrate 501 and the viewer-side substrate 502 include a first polarizing plate 520 and a second polarizing plate 523, respectively, on the outer side thereof. Furthermore, two kinds of electrodes, i.e. pixel electrodes 511 and common electrodes 512, are formed on the surface of the back-face side substrate 501 on the liquid crystal layer side. In a part of the area where the pixel electrode 511 and the common electrodes 512 are formed, a reflector 515 and an insulating layer 516 are provided between those electrodes and the back-face side substrate 501. The thickness of the liquid crystal layer 503 of the reflective area 521 is a half the thickness of the liquid crystal layer 503 of the transmissive area 522, because of an existence of the insulating layer 516. Further, a backlight 504 functioning as a light source for transmissive display is provided on the outer side (lower side) of the polarizing plate (first polarizing plate) of the back-face side substrate 501.

Further, as illustrated with dotted lines in FIG. 17A and FIG. 17B, the first polarizing plate 520 and the second polarizing plate 523 are arranged in such a manner that the polarizing axes thereof become orthogonal to each other. In the liquid crystal layer 503, the liquid crystal molecules are aligned to face in a direction that is shifted from the polarizing axis (light transmitting axis) of the first polarizing plate 520 by 90 degrees, when no voltage is applied. For example, if the polarizing axis of the first polarizing plate 520 is 0 degree, the polarizing axis of the second polarizing plate 523 is set as 90 degrees, and the major axis direction of the liquid crystal molecules of the liquid crystal layer 503 is set as 90 degrees. In the liquid crystal layer 503, a cell gap in the transmissive area 522 is so adjusted that retardation $\Delta nd$ ($\Delta n$ is refractive index anisotropy of the liquid crystal molecules, d is a cell gap of the liquid crystal) becomes $\lambda/2$ ($\lambda$ is a wavelength of light; e.g., $\lambda=550$ nm when green light is taken as reference), while a cell gap in the reflective area 521 is so adjusted that the retardation becomes $\lambda/4$.

Now, by referring to FIG. 17A, there is described an optical action of the unit pixel of the transflective liquid crystal display device in the above-described structure, when no voltage is applied to the liquid crystal layer 503. First, linear polarized light in the direction of 90 degrees (longitudinal direction) that has passed through the second polarizing plate 523 (referred to as "90-degree linear polarized light" hereinafter) makes incident on the liquid crystal layer 503 of the reflective area 521. In the liquid crystal layer 503, the optical axis of the linear polarized light that makes incident on the liquid crystal layer 503 and the major axis direction of the liquid crystal molecules are consistent. Therefore, the incident light in the state of 90-degree linear polarized light as it is transmits through the liquid crystal layer 503, and it is reflected by the reflector 515. In a case of the linear polarized light, it remains in the state of the linear polarized light even after being reflected. Thus, the reflected light in the state of 90-degree linear polarized light again makes incident on the liquid crystal layer 503. Further, the 90-degree linear polarized light as it is exits from the liquid crystal layer 503 and makes incident on the second polarizing plate 523. The polarizing axis of the second polarizing plate 523 is also 90 degrees, so that the 90-degree linear polarized light transmits through the second polarizing plate 523. Therefore, when there is no voltage applied, the reflective area 521 provides white display.

Next, described is the transmissive area 522 where no voltage is applied. The transverse linear polarized light that has passed through the first polarizing plate 520 makes incident on the liquid crystal layer 503 of the transmissive area 522. In the liquid crystal layer 503, the polarizing direction of the incident light and the major axis direction of the molecules are orthogonal to each other, so that the transverse linear polarized light passes therethrough without changing the polarized state, and makes incident on the second polarizing plate 523. Since the polarizing axis of the second polarizing plate 523 is 90 degrees, the transmitted light cannot passes through the second polarizing plate 523, which results in providing black display.

Next, by referring to FIG. 17B, there is described an optical action of the unit pixel of the transflective liquid crystal display device in the above-described structure, when a voltage is applied to the liquid crystal layer 503. First, linear polarized light in the direction of 90 degrees (longitudinal direction) that has passed through the second polarizing plate 523 makes incident on the liquid crystal layer 503 of the reflective area 521. By applying the voltage, the major axis direction of the liquid crystal in the liquid crystal layer 503 is changed from 0 degree to 45 degrees on the substrate plane. In the liquid crystal layer 503, the polarizing direction of the incident light and the major axis direction of the liquid crystal molecules are shifted from each other by 45 degrees, and the retardation of the liquid crystal is set as $\lambda/4$. Therefore, the longitudinal linear polarized light that has made incident on the liquid crystal layer 503 is turned into clockwise circular polarized light, and it makes incident on the reflector 515. The clockwise circular polarized light is reflected by the reflector 515 and turned into counterclockwise circular polarized light. The counterclockwise circular polarized light that has made incident on the liquid crystal layer 503 passes through the liquid crystal layer 503 again, which turns into transverse (0-degree) linear polarized light and makes incident on the second polarizing plate 523. Since the polarizing axis of the second polarizing plate 523 is 90 degrees, the reflected light cannot pass through the reflector 515, which results in providing black display.

Then, the transverse linear polarized light that has passed through the first polarizing plate 520 makes incident on the liquid crystal layer 503 of the transmissive area 522. By applying the voltage, the major axis direction of the liquid crystal molecules in the liquid crystal layer 503 is changed from 0 degree to 45 degrees on the substrate plane. In the liquid crystal layer 503, the polarizing direction of the incident light and the major axis direction of the liquid crystal molecules are shifted from each other by 45 degrees, and the retardation of the liquid crystal is set as $\lambda/2$. Therefore, the transverse linear polarized light that has made incident on the liquid crystal layer 503 is turned into longitudinal-direction linear polarized light, and it makes incident on the second polarizing plate 523. Therefore, in the transmissive area 522, the second polarizing plate 523 let through the backlight that has passed through the first polarizing plate 520, which results in providing white display.

With the transflective liquid crystal display device described above, there is such an inconvenience that white display and black display are inverted in the reflective area 521 and the transmissive area 522 in both cases where an electric field is applied to the liquid crystal layer 503 and where it is not applied.

As a measure for this, it is possible to provide consistency in displays of the reflective area and the transmissive area through applying voltages different from each other to the liquid crystal layer in the reflective area and the transmissive area of the transflective liquid crystal display device. For example, in the above-described IPS transflective liquid crystal display device, it is possible to apply different voltages to each of the reflective area and the transmissive area through setting a signal inputted to the common electrode of the reflective area (referred to as a reflective common signal hereinafter) and a signal inputted to the common electrode of the transmissive area (referred to as a transmissive common signal hereinafter) to be in opposite phases from each other.

Now, examples of waveforms of each input signal at the time of black display are shown in FIG. 18. There is a potential difference generated in the reflective area between the pixel electrode and the common electrode in a scanning line selected period, and a voltage is applied to the liquid crystal layer (Vlc of FIG. 18A), which results in providing black display. In the meantime, a signal that is in an inverted phase from that of the reflective common signal is inputted to the transmissive common electrode of the transmissive area. Thus, there is no potential difference generated between the pixel electrode and the common electrode in the scanning line selected period, so that no voltage is applied to the liquid crystal layer (Vlc of FIG. 18B), which also results in providing black display. Further, in order to keep the voltage to be applied to each liquid crystal layer within one frame period, it is necessary for the potential of the pixel electrode to change by following the potential of the common electrode. Since the voltages held in the transmissive area and the reflective area are different, it is necessary to provide a storage capacitance to each of the reflective area and the transmissive area.

Now, changes in the potentials of each electrode at the time of black display will be described. As shown in FIG. 19A, in the reflective area, it is necessary to apply a voltage to the liquid crystal layer at the time of black display. Thus, a potential difference (assumed to be 5V in this case) is generated between the common electrode and the pixel electrode in a scanning line selected period. Thereafter, potentials of the pixel electrode and a reflector 1 become floated in a scanning line non-selected period. Thus, the potentials of the pixel electrode and the reflector 1 are to follow the reflective common signal by synchronizing with it through forming a capacitance with the common electrode. Further, as shown in FIG. 19B, in the transmissive area, no voltage is applied to the liquid crystal layer at the time of black display. Thus, the potentials of the common electrode and the pixel electrode in the scanning line selected period become consistent. Thereafter, in the scanning line non-selected period, the potentials of the pixel electrode and the reflector are to follow the transmissive common signal by synchronizing with it through forming a capacitance with the common electrode.

Further, there is also disclosed a unit pixel structure with which displays of the reflective area and the transmissive area can be made uniform by controlling drives of the IPS transflective liquid crystal display device through providing a storage capacitance, respectively, to the reflective area and the transmissive area of the liquid crystal layer for applying different voltages from each other to the respective areas (Japanese Unexamined Patent Application 2005-191061: Patent Document 1). In Patent Document 1, two TFTs (Thin Film Transistors) corresponding to each of the reflective and transmissive areas as well as a first and a second common electrodes corresponding to each of the reflective and transmissive areas are provided. The reflective area and the transmissive area of the liquid crystal layer are driven by inputting signals that are inverted from each other to the two common electrodes.

Furthermore, there is also disclosed a liquid crystal display device in which: a transistor and a storage capacitance are provided by corresponding to each of a reflective area and a transmissive area; and a transistor Tr and storage capacitance lines CsrL and CstL are provided to each of the reflective area and the transmissive area (Japanese Unexamined Patent Publication 2005-189570: Patent Document 2). In Patent Document 2, the storage capacitance of the reflective area is formed with the pixel electrode and the storage capacitance line CsrL of the reflective area, and the storage capacitance of the transmissive area is formed with the pixel electrode and the storage capacitance line CstL of the transmissive area. Thereby, the storage capacitance is individually formed in each of the reflective area and the transmissive area. With this, different potentials can be applied to the pixel electrodes of the reflective area and the transmissive area. Further, the aperture ratio of the liquid crystal display device can be increased by forming the storage capacitance of the transmissive area in a lower layer of the reflector of the reflective area.

However, with the transverse electric field type transflective liquid crystal display device described above, it is not possible to achieve an excellent display by simply forming the storage capacitances for the reflective area and the transmissive area in the lower layer of the reflector. For example, when the reflective pixel electrode and the transmissive pixel electrode for forming the storage capacitance are disposed in the lower layer of the reflector in the structure of Patent Document 1, capacitance coupling occurs between both pixel electrodes and the reflector. Thus, the potentials of the pixel electrodes are shifted. Therefore, an offset voltage to be described later is applied to the liquid crystal layer, which causes deterioration in the contrast due to a leakage of light. There is also a similar problem raised when the reflective storage capacitance forming part and the transmissive storage capacitance forming part are overlapped with a layer that is made of another conductive substance.

SUMMARY OF THE INVENTION

An exemplary object of the invention is therefore to provide a transflective liquid crystal display device that is capable of suppressing a leakage of light and providing a high visibility.

In order to achieve the foregoing exemplary object, the transflective liquid crystal display device according to an exemplary aspect of the invention is a transflective liquid crystal display device that includes: within a unit pixel, a reflective area including a pixel electrode and a common electrode as a pair and a reflector, and a transmissive area including a pixel electrode and a common electrode as a pair; and a liquid crystal layer provided to the reflective area and the transmissive area, and the transflective liquid crystal display device further includes storage capacitances for the reflective area and the transmissive area for changing a potential of the pixel electrode by following a potential of the common electrode are provided in a lower layer of the reflector. The transflective liquid crystal display device further includes a suppressing device for suppressing a light leakage that is generated in the liquid crystal layer when the pixel electrode is affected by a potential of the reflector due to capacitance coupling generated between the reflector and the pixel electrode.

BRIEF DESCRIPTION OF THE DRAWINGS

FIGS. 14A-14C show the exemplary embodiment of the transflective liquid crystal display device disclosed in FIG. 10, in which FIG. 14A is a graph showing the relation between the capacitance ratio and offset voltages, FIG. 14B is a graph showing the relation between the transmittance and applied voltages, and FIG. 14C is a graph showing the relation between the organic film thickness and offset voltages;

FIG. 15 is a plan view showing a unit pixel structure of still another exemplary embodiment of the transflective liquid crystal display device according to the invention;

FIG. 16 is a plan view showing a unit pixel structure of yet another exemplary embodiment of the transflective liquid crystal display device according to the invention;

FIGS. 17A and 17B show an exemplary embodiment of a related transflective liquid crystal display device, in which FIG. 17A is a sectional view showing a unit pixel structure when no voltage is applied between a pixel electrode and a common electrode, and FIG. 17B is a sectional view showing a unit pixel structure when a voltage is applied between a pixel electrode and a common electrode;

DETAILED DESCRIPTION OF THE EXEMPLARY EMBODIMENTS

Figure 1:
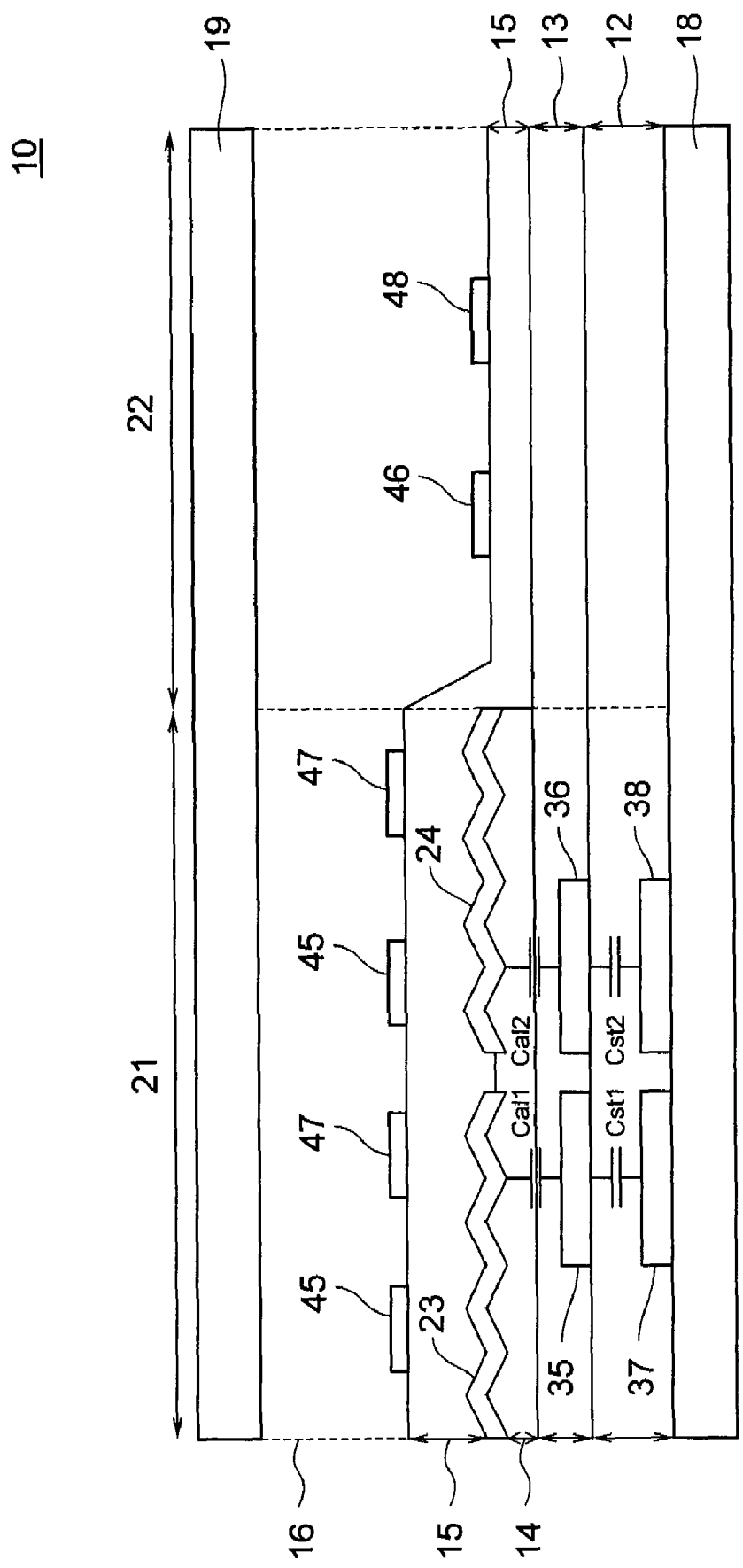
FIG. 1 is a sectional view showing a unit pixel structure of an exemplary embodiment of a transflective liquid crystal display device according to the invention.

Hereinafter, exemplary embodiments of the invention will be described in detail by referring to the accompanying drawings.

The operation theory of a transflective liquid crystal display device will be described by referring to a case of an IPS transflective liquid crystal display device. As shown in FIG. 17A and FIG. 17B, $\Delta nd$ (retardation) of a liquid crystal layer 503 in a reflective area 521 is $\lambda/4$, and $\Delta nd$ of the liquid crystal layer 503 in a transmissive area 522 is $\lambda/2$. The liquid crystal layer 503 is sandwiched between polarizing plates 520 and 523 whose transmission axes are orthogonal to each other. Therefore, the reflective area 521 becomes normally white, and the transmissive area 522 becomes normally black. In order for the reflective area 521 and the transmissive area 522 to have uniform displays, it is necessary to apply voltages different from each other to the liquid crystal layer 503 of the reflective area 521 and that of the transmissive area 522. Different voltages can be applied by setting a phase of a signal (reflective common signal) inputted to a common electrode 512 of the reflective area 521 to be opposite from a phase of a signal (transmissive common signal) inputted to a common electrode 512 of the transmissive area 522.

Figure 18A:
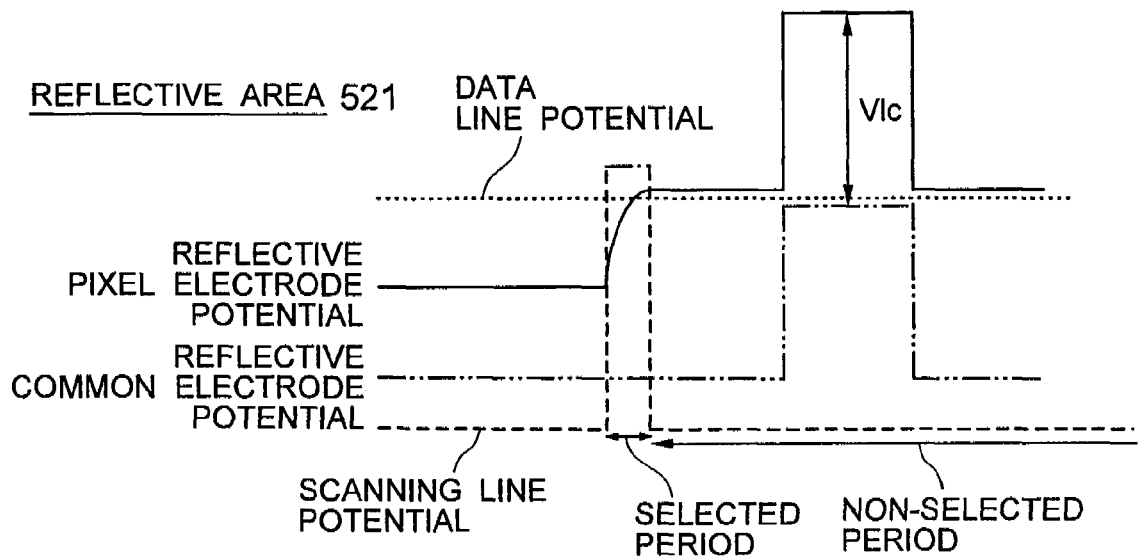
FIG. 18 shows voltage waveform charts of the exemplary embodiment of the transflective liquid crystal display device disclosed in FIG. 17A and FIG. 17B.
Figure 18B:
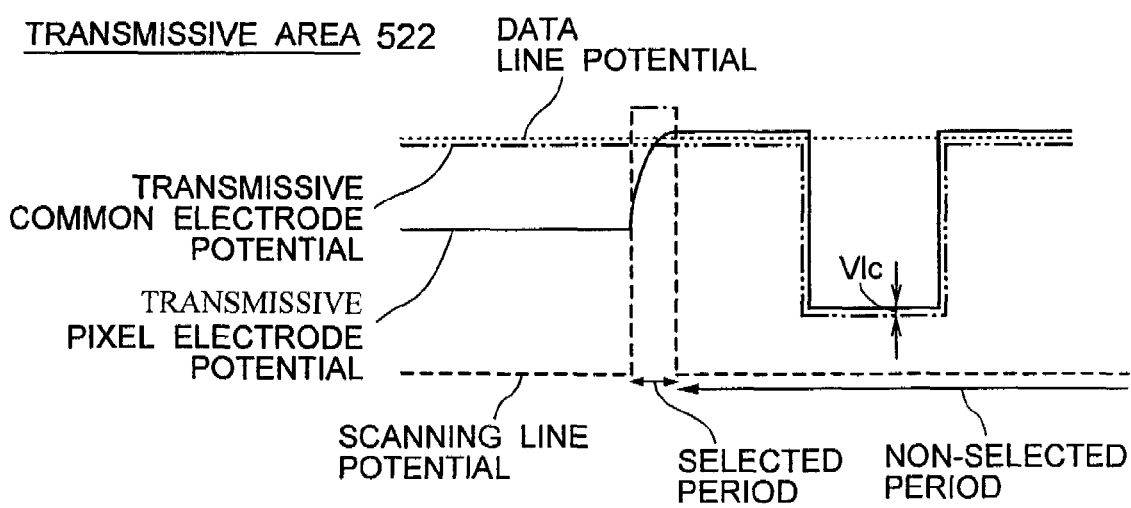

FIG. 18A and FIG. 18B illustrate waveforms of each input signal at the time of black display. There is a potential difference generated in the reflective area 521 between the reflective pixel electrode 511 and the reflective common electrode 512 in a scanning line selected period, and a voltage is applied to the liquid crystal layer 503 of the reflective area 521 (Vlc of FIG. 18A). Thus, the display in the reflective area 521 becomes black. In the meantime, a signal of an inverted phase from that of the signal for the reflective common electrode 512 is inputted to the transmissive common electrode 512 in the transmissive area 522. Thus, there is no potential difference generated between the transmissive pixel electrode 511 and the transmissive common electrode 512 in the scanning line selected period, so that no voltage is applied to the liquid crystal layer 503 of the transmissive area 522 (Vlc of FIG. 18B). Therefore, the display in the transmissive area 522 becomes black.

In order to keep the voltage to be applied to each liquid crystal layer 503 of the reflective area 521 and the transmissive area 522 within one frame period, it is necessary for the potential of the pixel electrode 511 to change by following the potential of the common electrode 512. Since the voltages held in the transmissive area 522 and the reflective area 521 are different, it is necessary to provide a storage capacitance to each of the reflective area 521 and the transmissive area 522. Accordingly, it is necessary to provide a transistor and a storage capacitance to each of the reflective area 521 and the transmissive area 522 of a unit pixel to realize the IPS transflective liquid crystal display device operating as described above.

Figure 5:
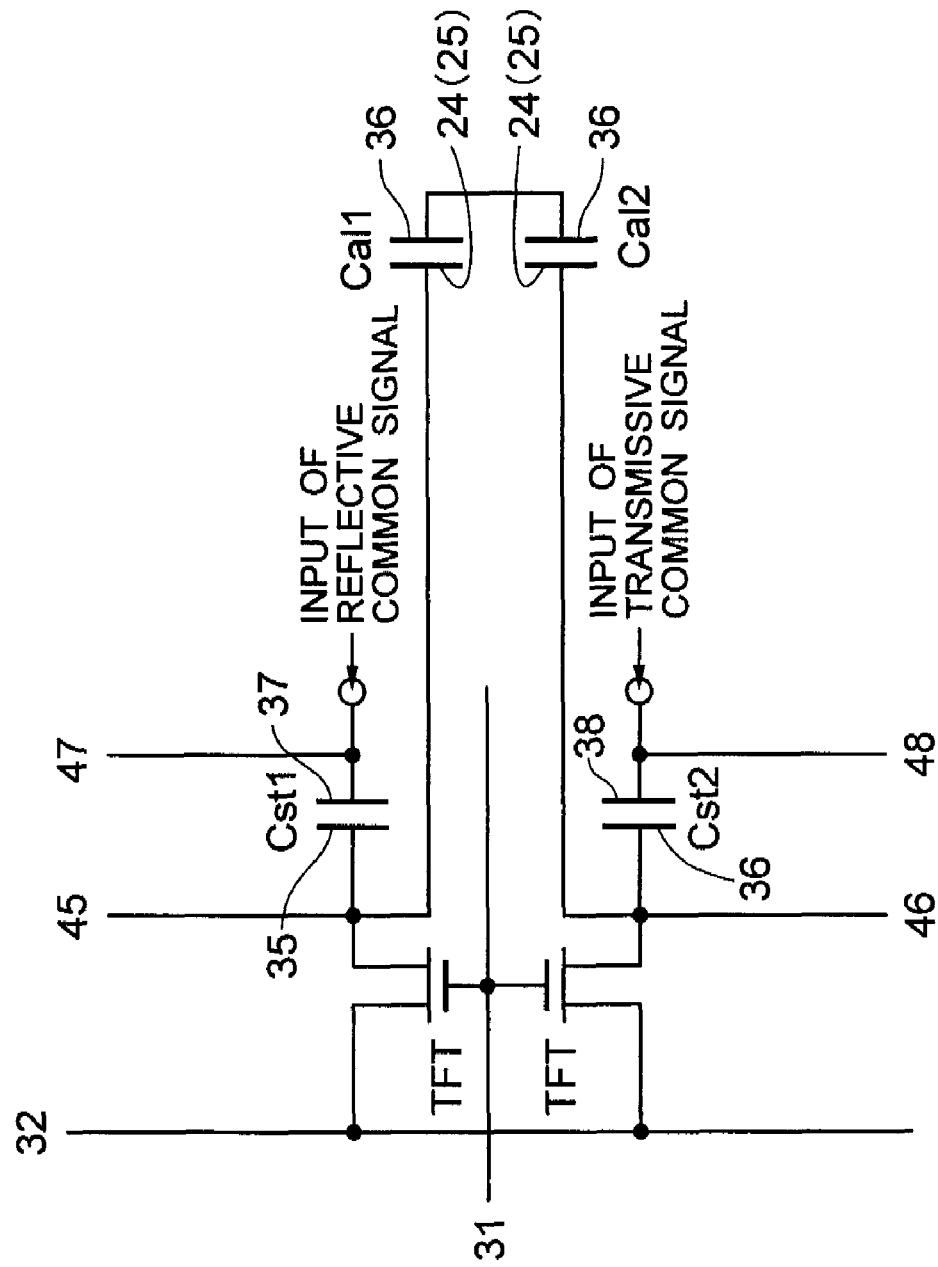
FIG. 5 is a plan circuit block diagram showing the constitution of the exemplary embodiment of the transflective liquid crystal display device disclosed in FIG. 1.

As shown in FIG. 1, FIG. 10, FIG. 15, and FIG. 16, the exemplary embodiments of the invention include storage capacitances Cst1, Cst2 for changing the potentials of pixel electrodes 45, 46 of the reflective area 21 and the transmissive area 22 by following the potentials of common electrodes 47, 48 of the reflective area 21 and the transmissive area 22. Those storage capacitances Cst1 and Cst2 are disposed in an under layer of reflectors 23, 24, and 25 of the reflective area 21. The storage capacitance Cst1 of the reflective area 21 is formed between a static electrode (reflective pixel electrode) 35 and a common electrode (reflective common electrode) 37 of the reflective area 21, and a capacitance Cal1 is formed between the reflectors 23, 24, 25 and the static electrode (reflective pixel electrode) 35 of the reflective area 21. The storage capacitance Cst2 of the transmissive area 22 is formed between a static electrode (transmissive pixel electrode) 36 and a common electrode (transmissive common electrode) 38 of the reflective area 21, and a capacitance Cal2 is formed between the reflectors 23, 24, 25 and the static electrode (transmissive pixel electrode) 36 of the reflective area 21. FIG. 5 shows an equivalent circuit according to the exemplary embodiments of the invention.

That is, as shown in FIG. 5, a gate of a transistor TFT formed in the reflective area 21 is connected to a scanning line 31, either a source or drain thereof is connected to a data line 32, and the other one (the source or the drain) is connected to the reflective pixel electrode A35 formed in the reflective area 21. Similarly, a gate of a transistor TFT formed in the transmissive area 22 is connected to the scanning line 31, either a source or drain thereof is connected to the data line 32, and the other one (the source or the drain) is connected to the transmissive pixel electrode A36 formed in the reflective area 21.

The reflectors 23, 24 (25) are formed as a single continuous plate, and the capacitances Cal1 and Cal2 are disposed in the lower layers of the reflectors 23, 24 (25). Therefore, the reflective pixel electrode 35 and the transmissive pixel electrode 36 are capacitive-coupled by the capacitances Cal1 and Cal2.

Now, there will be described the issues that are raised when the reflective pixel electrode 35 and the transmissive pixel electrode 36 are capacitive-coupled by the capacitances Cal1 and Cal2. For describing the issues, changes in the potentials of each electrode at the time of black display will be described in detail by referring to FIG. 19 and FIG. 6. In the following explanations, it is assumed that the reflectors 23 and 24 are a single reflector in a continuously integrated form.

Figure 19A:
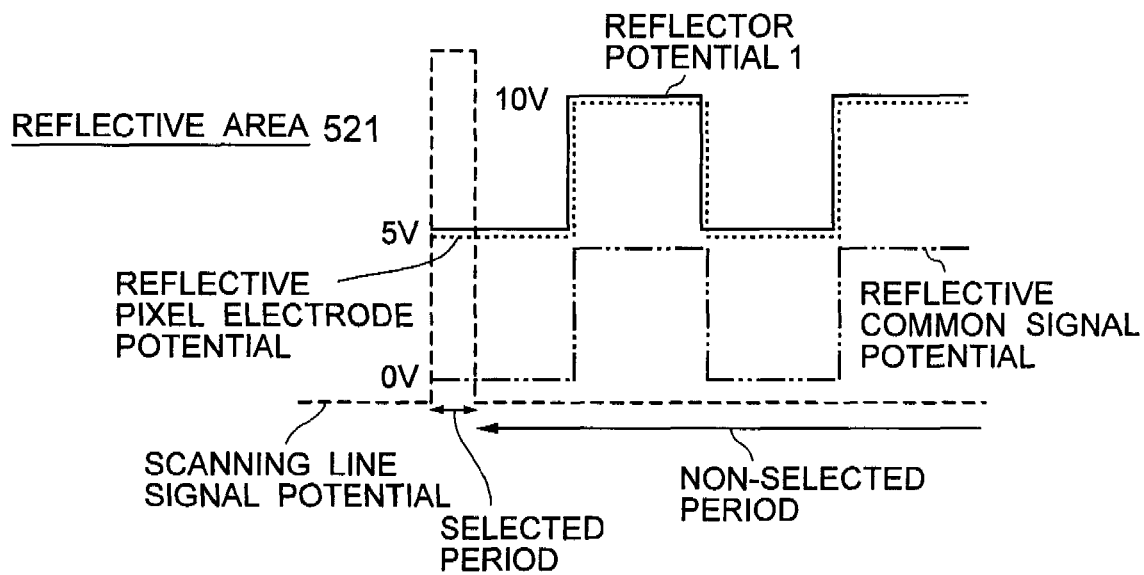
FIG. 19 shows voltage waveform charts of the exemplary embodiment of the transflective liquid crystal display device disclosed in FIG. 17A and FIG. 17B.

As shown in FIG. 19A, it is necessary to apply a voltage to the liquid crystal layer 16 of the reflective area 21 at the time of black display. Thus, there is a potential difference (assumed to be 5V in this case) generated between the common electrode 47 and the pixel electrode 45 in a selected period of the scanning line 31. Thereafter, potentials of the pixel electrode 45 and the reflectors 23, 24 become floated in a non-selected period of the scanning line 31. Thus, the potentials of the pixel electrode 35 and the reflectors 23, 24 are to follow the reflective common signal by synchronizing with it by the storage capacitance Cst1 between the pixel electrode 35 and the common electrode 37.

Figure 6A:
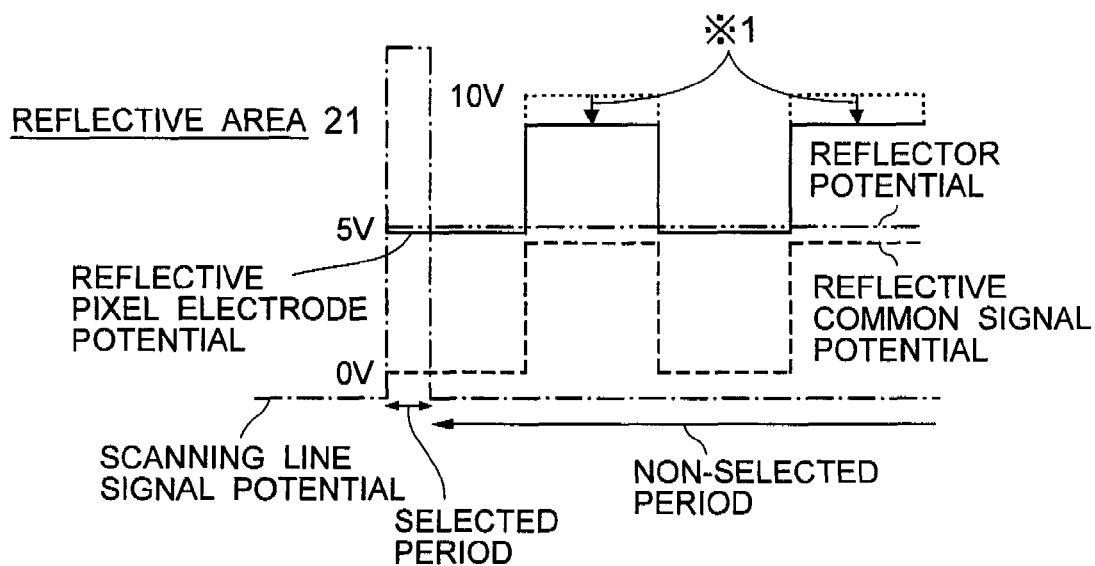
FIG. 6 shows voltage waveform charts of the exemplary embodiment of the transflective liquid crystal display device disclosed in FIG. 1.
Figure 19B:
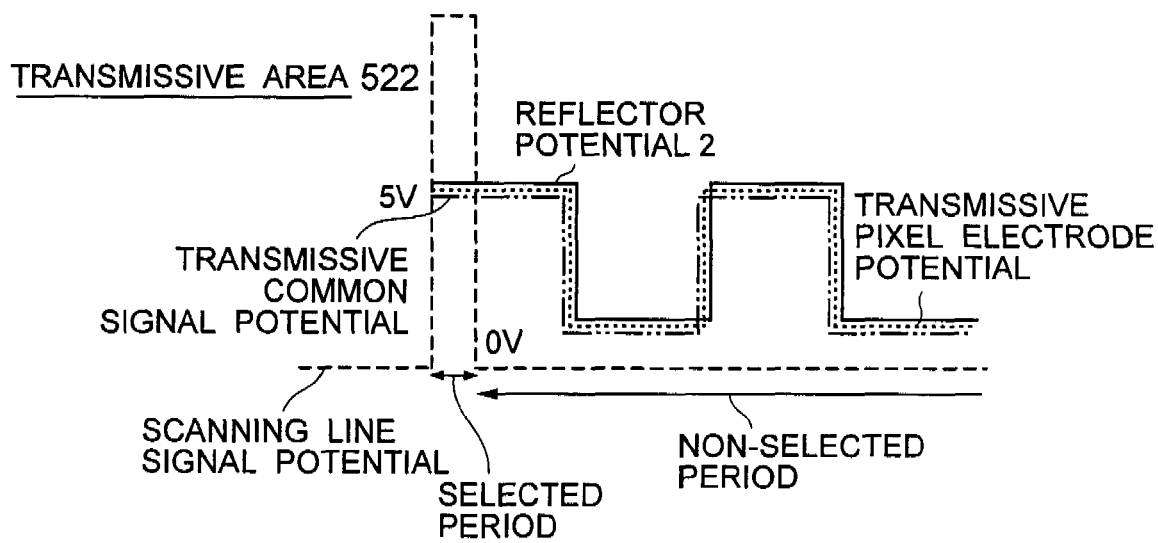

As shown in FIG. 19B, in the transmissive area 22, no voltage is applied to the liquid crystal layer 16 at the time of black display. Thus, the potentials of the common electrode 48 and the pixel electrode 46 in the non-selected period of the scanning line 31 become consistent. Thereafter, in the non-selected period of the scanning line 31, the potentials of the pixel electrode 36 and the reflectors 23, 24 are to follow the transmissive common signal by synchronizing with it by the storage capacitance Cst2 between pixel electrode 36 and the common electrode 38. However, when the reflector 23 and the reflector 24 are connected, the potential of the reflector 23 and the potential of the reflector 24 shown in FIG. 19A and FIG. 19B are added up. Thus, as shown in FIG. 6A, it can be considered that the potential is being fixed (at 5V in this case). Under such condition, in the transmissive area 22, the potential of the pixel electrode 46 is affected by the potential of the reflectors 23, 24 because of the capacitance coupling (capacitance Cal2) when the potential of the common electrode 48 becomes 0V, as in FIG. 6B. Therefore, the potential of the pixel electrode 46 becomes larger than 0V. The capacitance Cal2 and the storage capacitance Cst2 are considered to be connected in series, so that the potential difference between the reflectors 23, 24 and the common electrode 38 is distributed in an inverse ratio of the storage capacitance Cst2 to the capacitance Cal2. Accordingly, the change ΔV in the potential of the pixel electrode 48 can be expressed by a following equation, provided that the potential difference between the reflectors 23, 24 and the common electrode 38 is V, the value of the storage capacitance Cst2 is Cst, and the value of the capacitance Cal2 formed with the reflectors 23, 24 and the pixel electrode 36 is Cal.

$$\Delta V = V \times Cal/(Cst+Cal)$$

"ΔV" is called an offset voltage. The voltage of "ΔV" is applied to the liquid crystal layer 16 of the transmissive area 22 at the time of black display.

Figure 7:
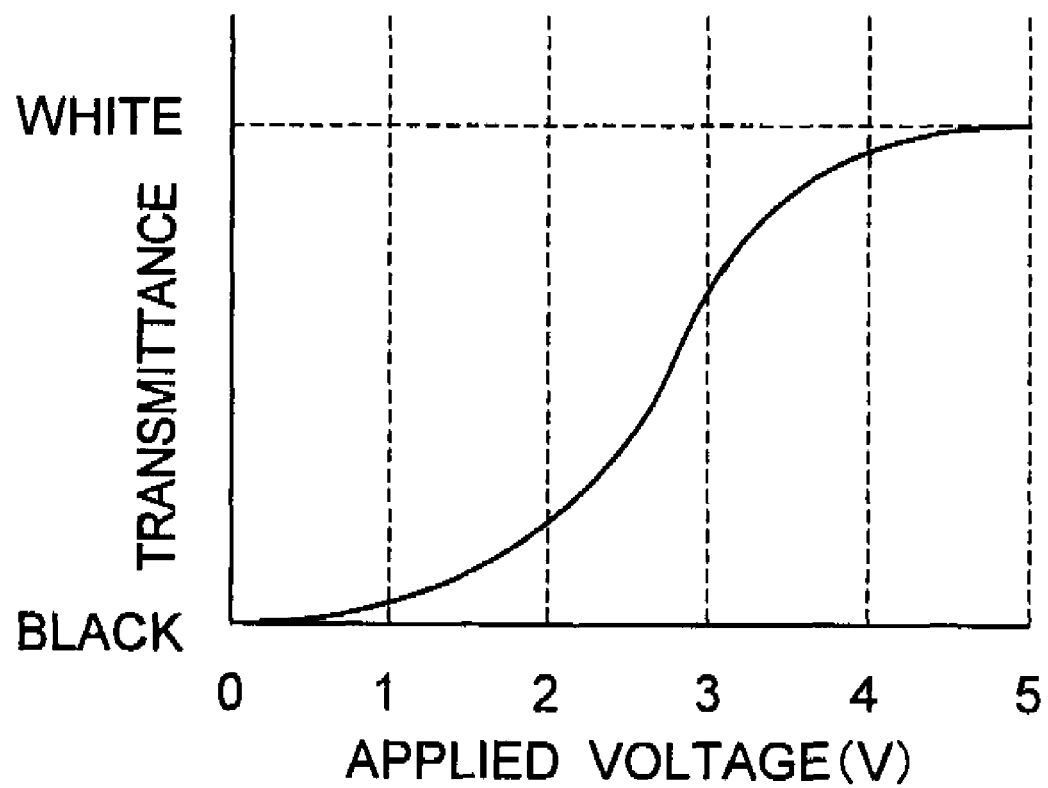
FIG. 7 is a graph showing the relation between the transmittance and applied voltages according to the exemplary embodiment of the transflective liquid crystal display device disclosed in FIG. 1.

FIG. 7 shows an example of a property showing the relation between the transmittance and the applied voltage. As can be seen from FIG. 7, the transmittance starts to increase when a voltage of 0.5V or more is applied to the liquid crystal layer 16. This voltage is called a threshold voltage. When the offset voltage ΔV is larger than the threshold voltage, the alignment of the liquid crystal at the time of black display is changed and a light leakage occurs. Thereby, the contrast is deteriorated. Similarly, a sufficient voltage cannot be applied to the reflective area 21 because of the offset voltage ΔV, so that a light leakage occurs therein as well.

Therefore, in order to suppress deterioration in the visibility caused by such light leakage, the exemplary embodiment of the invention further includes a suppressing device for suppressing the light leakage generated in the liquid crystal layer 16 because the pixel electrodes 35, 36 are affected by the potentials of the reflectors 23, 24, 25 due to the capacitance coupling of the capacitances Cal1, Cal2 formed between the reflectors 23, 24, 25 and the pixel electrodes 35, 36.

As described above, the transflective liquid crystal display device according to the exemplary embodiment of the invention is directed to the transflective liquid crystal display device which includes: within a unit pixel, the reflective area 21 including the pixel electrode 45 and the common electrode 47 as a pair and the reflector, and the transmissive area 22 including the pixel electrode 46 and the common electrode 48 as a pair; and the liquid crystal layer 16 provided in the reflective area 21 and the transmissive area 22. Further, as shown in FIG. 1, FIG. 10, FIG. 15, and FIG. 16, as the basic structure, the transflective liquid crystal display device includes the storage capacitances Cst1, Cst2 for the reflective area 21 and the transmissive area 22 provided in the lower layers of the reflectors 23, 24, 25 for changing the potentials of the pixel electrodes 45, 46 to follow the potentials of the common electrodes 47, 48. Further, the transflective liquid crystal display device includes the suppressing device for suppressing the light leakage that is generated in the liquid crystal layer 16 when the pixel electrodes 35, 36 are affected by the potentials of the reflectors 23, 24, 25 due to the capacitance coupling of the capacitances Cal1, Cal2 formed between the reflectors 23, 24, 25 and the pixel electrodes 35, 36. The details of the suppressing device will be described later.

With the exemplary embodiment of the invention, the potential of the pixel electrode changes by following the potential of the common electrode because there are the storage capacitances Cst1, Cst2 for the reflective areas 21 and the transmissive areas 22 provided in the lower layers of the reflectors 23, 24, 25. Therefore, the voltages applied to the liquid crystal layer 16 of the reflective area 21 and the transmissive area 22 within one frame period can be maintained in a rated manner.

Due to the capacitance coupling that is caused between the reflectors 23, 24, 25 and the pixel electrodes 35, 36 because of the capacitances Cal1, Cal2, a light leakage occurs in the liquid crystal layer 16 since the pixel electrodes 35, 36 are affected by the potentials of the reflectors 23, 24, 25. However, in the exemplary embodiment of the invention, the light leakage in the liquid crystal layer 16 can be suppressed by the suppressing device.

As an exemplary advantage according to the invention, the exemplary embodiment of the invention includes: the storage capacitances for the reflective area and the transmissive area provided in the lower layers of the reflectors for changing the potentials of the pixel electrodes by following the potentials of the common electrodes; and the suppressing device for suppressing the light leakage that occurs in the liquid crystal layer because the potentials of the pixels electrodes are affected by the potentials of the reflectors due to the capacitance coupling generated between the reflectors and the pixel electrodes. Therefore, it becomes possible for the potentials of the pixel electrodes to follow the potentials of the common electrodes. Moreover, it is possible to suppress the light leakage occurring in the liquid crystal layer caused due to the capacitance coupling generated by the storage capacitances, so that the visibility of the liquid crystal display device can be improved.

Next, the transflective liquid crystal display device according to the invention, particularly a concretive example of the suppressing device, will be described in more details by referring to the drawings.

First Exemplary Embodiment

The suppressing device according to a first exemplary embodiment of the invention is formed to suppress the offset voltage ΔV to be applied to the liquid crystal layer 16 by employing a structure where the capacitance Cal1 of the reflective area 21 and the capacitance Cal2 of the transmissive area 22 are electrically isolated. Hereinafter, the first exemplary embodiment will be described in a concretive manner.

Figure 2:
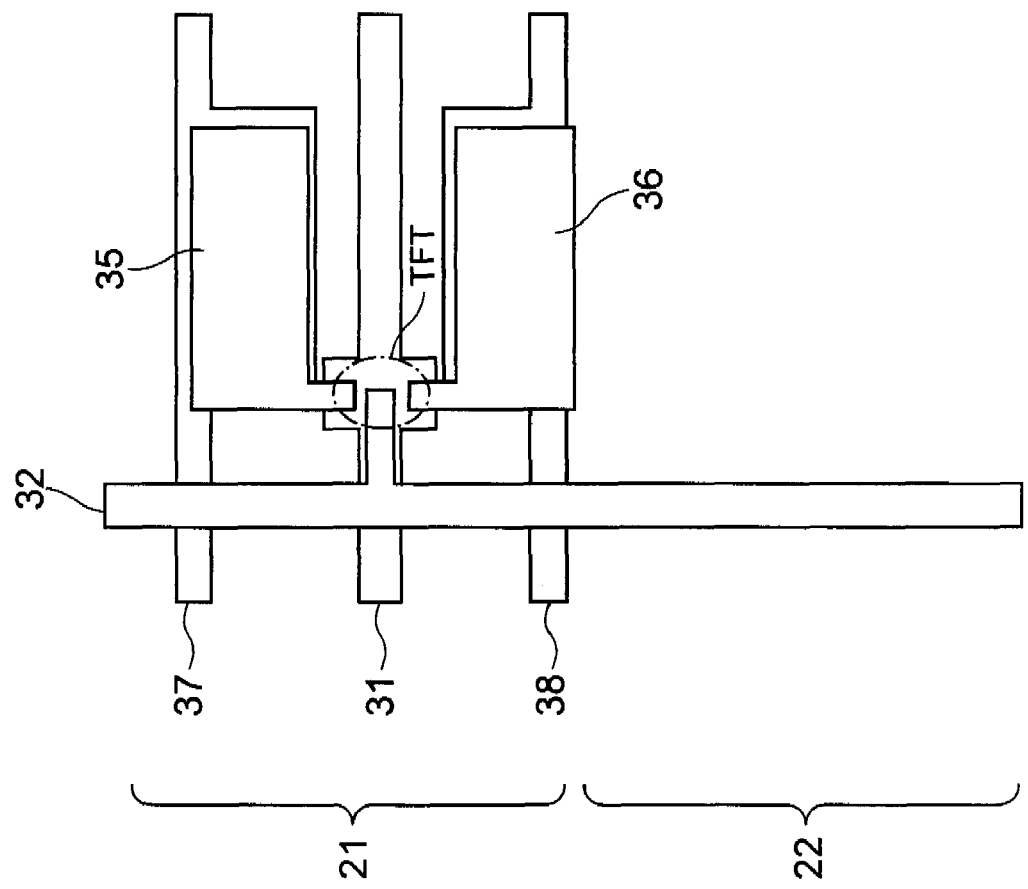
FIG. 2 is a plan view showing the structure of the exemplary embodiment of the transflective liquid crystal display device disclosed in FIG. 1.

As shown in FIG. 1, a unit pixel structure 10 of the liquid crystal display device according to the first exemplary embodiment includes a back-face side substrate 18 that is configured with a reflective area 21 and a transmissive area 22, and a reflective common electrode A37 and a transmissive common electrode A38 are formed on the reflective area 21 side of the viewer-side surface of the back-face side substrate 18. Further, a scanning line 31 (FIG. 2) is formed on the same plane where the reflective common electrode A37 and the transmissive common electrode A38 are formed. As shown in FIG. 2, the transmissive common electrode A38, the scanning line 31, and the reflective common electrode A37 are formed in parallel towards the direction away from the transmissive area side in order of the transmissive common electrode A38, the scanning line 31, and the reflective common electrode A37. Further, as shown in FIG. 1, an insulating layer 12 is formed on the viewer side of the back-face side substrate 18 by covering the transmissive common electrode A38 and the reflective common electrode A37.

Further, as shown in FIG. 1, the reflective pixel electrode A35 is formed to overlap with the reflective common electrode A37 on the viewer side of the reflective area 21 of the insulating layer 12. In other words, the reflective pixel electrode A35 is formed over the reflective common electrode A37 when viewed from the viewer side. Thereby, the reflective storage capacitance Cst1 with the reflective common electrode A37 is formed on the back-face side (within the insulating layer 12) of the reflective pixel electrode A35. Similarly, the transmissive pixel electrode A36 is formed to overlap with the transmissive common electrode A38 on the viewer side of the reflective area 21 of the insulating layer 12. Thereby, the transmissive storage capacitance Cst2 with the transmissive common electrode A38 is formed on the back-face side (within the insulating layer 12) of the transmissive pixel electrode A36.

Further, as shown in FIG. 2, a data line 32 to which data signals for each pixel are supplied is formed to cross with the transmissive common electrode A38, the scanning line 31, and the reflective common electrode A37 perpendicularly on the same plane where the reflective pixel electrode A35 and the transmissive pixel electrode A36 are formed. As shown in FIG. 2, there is formed a switching device (referred to as TFT hereinafter) for connecting protruded parts of each of the data line 32, the reflective pixel electrode A35, and the transmissive pixel electrode A36 mutually (a part circled with a dashed line). Further, as shown in FIG. 1, an insulating layer 13 is formed in the reflective area 21 and the transmissive are 22 by covering the viewer side of the insulating layer 12 including the reflective pixel electrode A35 and the transmissive pixel electrode A36 with an insulating layer.

Figure 3:
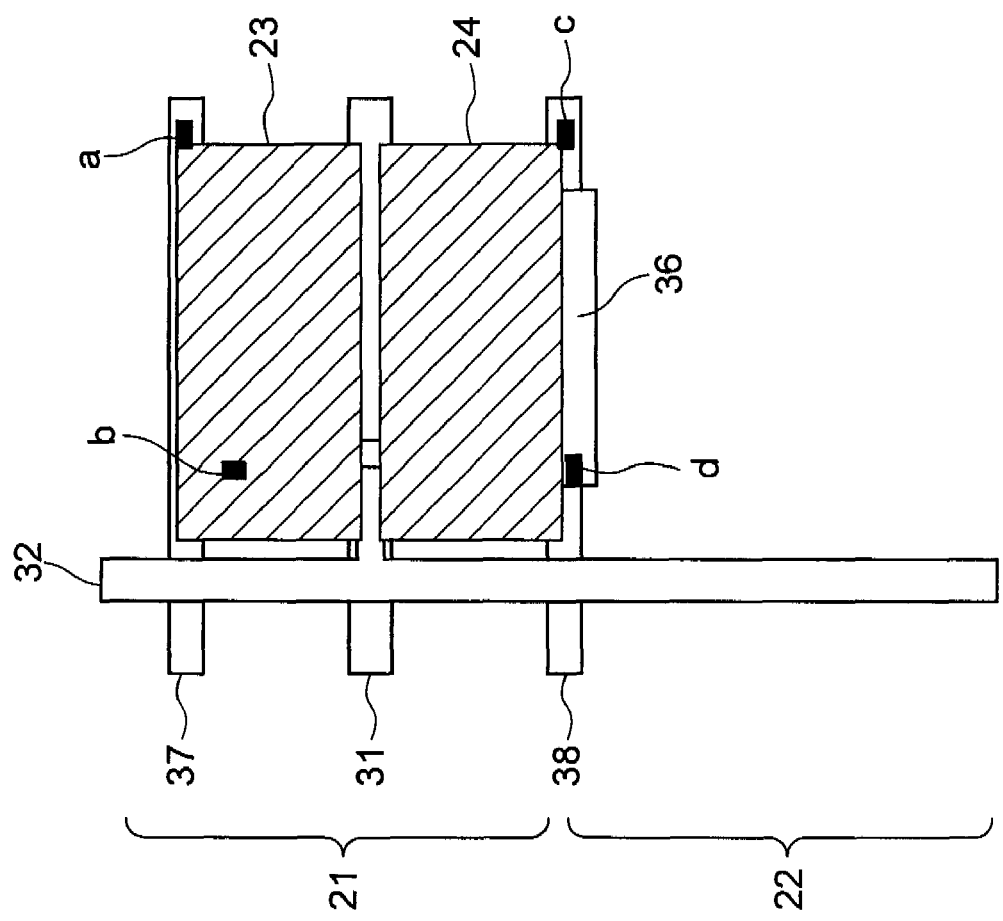
FIG. 3 is a plan view showing the structure of the exemplary embodiment of the transflective liquid crystal display device disclosed in FIG. 1.

Further, an organic film layer 14 is formed in the reflective area 21 on the viewer side of the insulating layer 13. The organic film layer 14 has, on the viewer-side face, an uneven pattern that fits to the reflector to be described later. Further, as shown in FIG. 1 and FIG. 3, a reflector 23 is formed to overlap with the reflective pixel electrode A35 on the viewer-side face of the organic film layer 14. That is, the reflector 23 is disposed to be over the reflective pixel electrode A35 when viewed from the viewer side. With this, a capacitance Cal1 is formed between the back-face side of the reflector 23 and the reflective pixel electrode A35. Further, a reflector 24 is formed to overlap with the transmissive pixel electrode A36 on the viewer-side face of the organic film layer 14. That is, the reflector 24 is disposed to be over the transmissive pixel electrode A36 when viewed from the viewer side. With this, a capacitance Cal2 is formed between the back-face side of the reflector 24 and the transmissive pixel electrode A36.

Further, as shown in FIG. 3, the reflector 23 and the reflector 24 are separated physically, so that the capacitance Cal1 and the capacitance Cal2 described above are isolated electrically. The reflectors 23 and 24 are formed to have an uneven pattern on their cross sections in order to improve the scattering effect.

Further, as shown in FIG. 1, a flattening film layer 15 is formed by covering the viewer side of the reflectors 23, 24 of the reflective area 21 and the viewer side of the insulating layer 13 of the transmissive area 22 with a flattening film. By adjusting the thickness of the flattening film layer 15, cell gaps of each liquid crystal layer in the reflective area 21 and the transmissive area 22 can be adjusted.

Figure 4:
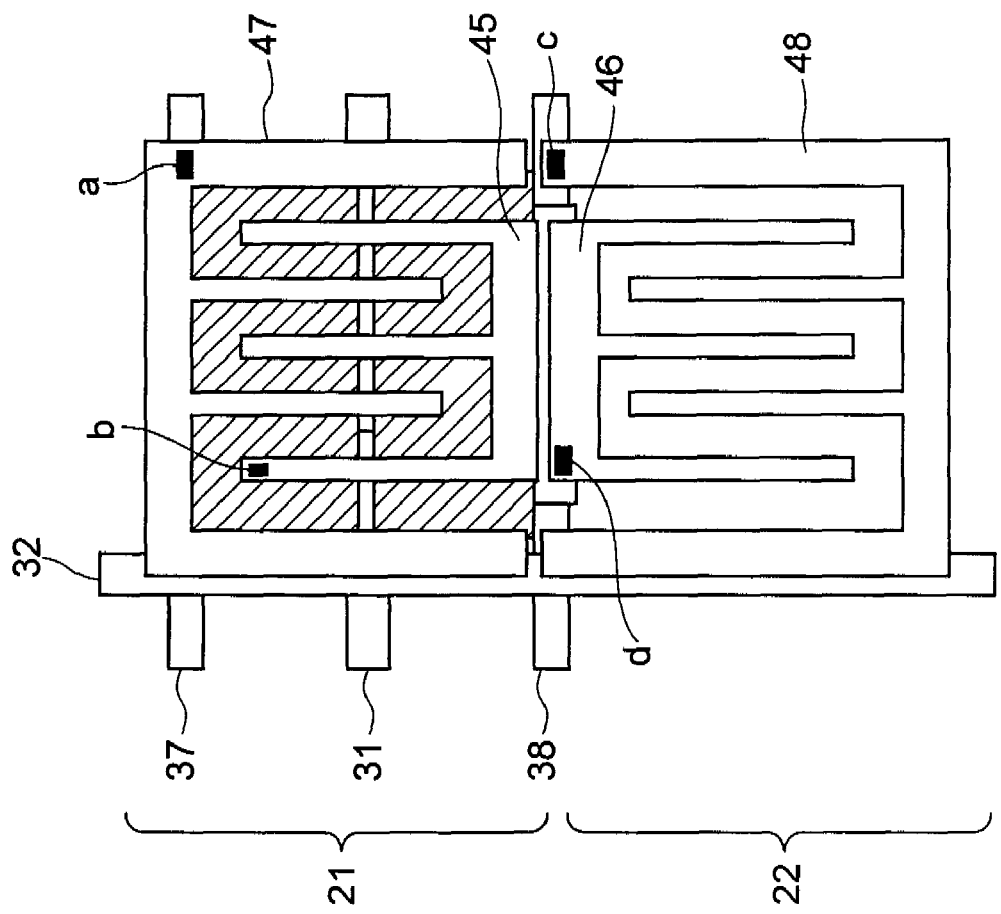
FIG. 4 is a plan view showing the structure of the exemplary embodiment of the transflective liquid crystal display device disclosed in FIG. 1.

Before forming a reflective common electrode B47, a reflective pixel electrode B45, a transmissive common electrode B48, and a transmissive pixel electrode B46, contact holes a-d are formed in the reflective area 21 and the transmissive area 22 as shown in FIG. 3 and FIG. 4. Thereby, the reflective common electrode B47, the reflective pixel electrode B45, the transmissive common electrode B48, and the transmissive pixel electrode B46 are connected to the reflective common electrode A37, the reflective pixel electrode A35, the transmissive common electrode A38, and the transmissive pixel electrode A36 via the contact holes a-d, respectively.

Further, as shown in FIG. 4, the comb-like shape reflective common electrode B47 and the comb-like shape reflective pixel electrode B45 are arranged on the viewer-side face of the flattening film layer 15 in such a manner that the protruded parts of the respective electrodes face in the direction towards the inner side of the reflective area to be opposed. Thereby, in the reflective area 21, the reflective pixel electrode B45 and the reflective common electrode B47 are arranged in an alternate manner in a direction orthogonal to the longitudinal direction of the comb teeth. Similarly, the comb-like shape transmissive common electrode B48 and the comb-like shape transmissive pixel electrode B46 are arranged on the viewer-side face of the flattening film layer 15 of the transmissive area 22 in such a manner that the protruded parts of the respective electrodes face in the direction towards the inner side of the transmissive area to be opposed. Thereby, in the transmissive area 22, the transmissive pixel electrode B46 and the transmissive common electrode B48 are arranged in an alternate manner in a direction orthogonal to the longitudinal direction of the comb teeth.

Further, as shown in FIG. 1, a liquid crystal layer 16 is formed on an upper layer (viewer side) of the flattening film layer 15 by covering the reflective pixel electrode B45, the reflective common electrode B47, the transmissive pixel electrode B46, and the transmissive common electrode B48. Regarding the crystal layer 16, retardation $\Delta$nd thereof in the reflective area 21 is set as $\lambda/4$, and retardation $\Delta$nd thereof in the transmissive area 22 is set as $\lambda/2$. Further, a viewer-side substrate 19 is provided on the viewer side of the liquid crystal layer 16. Thereby, a unit pixel of the liquid crystal display device according to the exemplary embodiment is configured.

The liquid crystal display device of the exemplary embodiment is structured in the above-described manner, so that an electric field is generated between the reflective common electrode B47 and the reflective pixel electrode B45 and between the transmissive common electrode B48 and the transmissive pixel electrode B46 arranged on the upper layer (viewer side) of the flattening film 15 so as to rotationally drive the liquid crystal.

Now, there is described a case where the reflectors 23 and 24 in the unit pixel structure of the liquid crystal display device 10 shown in FIG. 1-FIG. 4 are not electrically isolated. FIG. 5 shows an equivalent circuit of such case.

As shown in FIG. 5, the storage capacitances Cst1 and Cst2 corresponding to the reflective and transmissive areas, respectively, are formed on the lower layer side of the reflectors. In this case, the reflective pixel electrode A35 and the transmissive pixel electrode A36 are also arranged to oppose to the reflectors with the insulating layer 13 and the organic film layer 14 interposed therebetween. Therefore, capacitance coupling of the Cal1 and Cal2 occurs between the respective pixel electrodes and reflectors.

Because of this, the potentials of the reflective pixel electrode A35 and the transmissive pixel electrode A36 are affected by the potentials of the reflectors. Therefore, as shown in FIG. 6A, the potential difference between the potential of the reflective pixel electrode A35 (reflective pixel signal potential) and the potential of the reflective common electrode A37 (reflective common signal potential) in the reflective area 21 becomes smaller than the case where there is no influence from the potential of the reflectors (FIG. 19A). That is, it becomes smaller than a value that is about twice the amplitude of the reflective common signal potential (arrows marked with ✕1).

In other words, when the reflectors 23 and 24 are not electrically isolated, the potentials of the reflectors 1 and 2 shown in FIG. 19A and FIG. 19B are added up. Thus, as shown in FIG. 6A, it can be considered that the potential is being fixed (at 5V in this case, reflector potential). In this case, in the reflective area 21, the reflective pixel electrode potential when the reflective common signal potential becomes 5V is smaller than 10V in a non-selected period of the scanning line signal potential (arrows marked with ✕1). This means that it is not possible to apply a sufficient voltage to the liquid crystal, which may result in causing a light leakage.

Figure 6B:
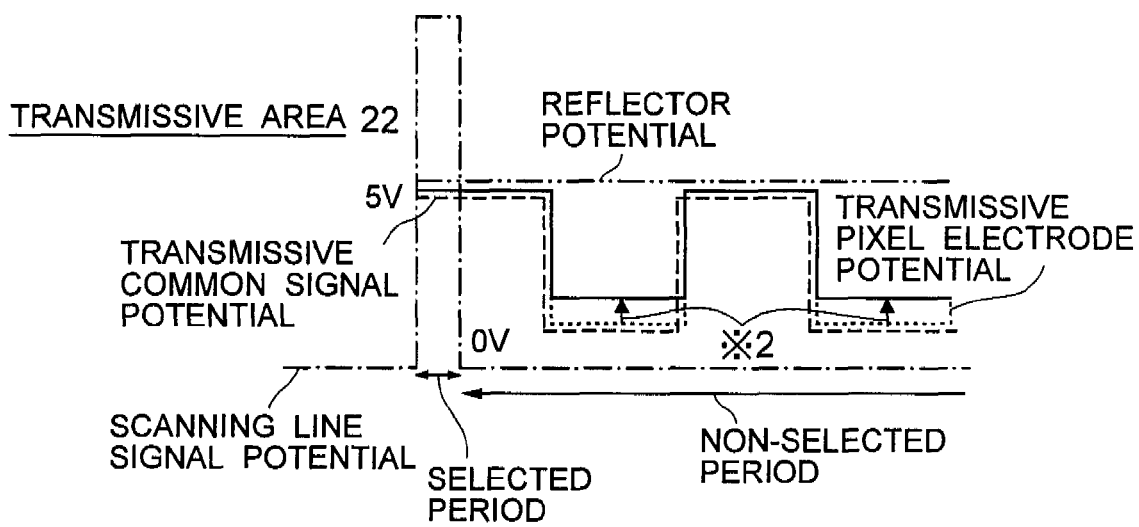

Further, as shown in FIG. 6B, there is a potential difference generated between the potential of the transmissive pixel electrode A36 (transmissive pixel electrode potential) and the potential of the reflective common electrode A38 (transmissive common signal potential) in the transmissive area 22. It is larger (arrows marked with ✕2) than the case where there is no influence from the potential of the reflectors (FIG. 19B: potential difference=0).

In other words, as shown in FIG. 6B, the transmissive pixel electrode potential when the transmissive common signal potential becomes 0V is larger than 0V in the transmissive area 22 in a non-selected period of the scanning line signal potential (arrows marked with ✕2). In this case, it is also considered to have a light leakage in the display because voltage is not sufficiently blocked.

Here, it can be considered that the storage capacitances (Cst1, Cst2) and the capacitances formed by the reflective pixel electrode A35, the transmissive pixel electrode A36, and the reflectors are connected in series. Therefore, the potential difference between the reflectors and the reflective common electrode A37 as well as the transmissive common electrode A38 is distributed in an inverse ratio of each capacitance. Accordingly, the change ΔV (referred to as "offset voltage" hereinafter) in the potential of the pixel electrode can be expressed by a following equation, provided that the potential difference between the reflectors and each common electrode is V, the value of the storage capacitance is Cst, and the value of the capacitance formed between the reflector and the pixel electrode is Cal.

$$\Delta V = V \times Cal/(Cst+Cal)$$

Therefore, the offset voltage (ΔV) is applied to the liquid crystal layer of the transmissive area at the time of black display. Thus, the voltage cannot be blocked sufficiently, thereby causing a light leakage.

FIG. 7 shows an example of the relation between the transmittance and the applied voltage. As shown in FIG. 7, it can be considered that the transmittance starts to increase when a voltage of 0.5V or more is applied to the liquid crystal. This value (0.5V in this case) is called a threshold voltage. Therefore, when the offset voltage is larger than the threshold voltage at the time of black display in the transmissive area 22, there is a change in the alignment of the liquid crystal, which results in causing a light leakage. Similarly, a light leakage occurs also in the reflective area 21, since a sufficient voltage cannot be applied to the liquid crystal because of an influence of the offset voltage.

As a measure for this, in the unit pixel structure of the exemplary embodiment as described above, the storage capacitances corresponding to the reflective area 21 and the transmissive area 22, respectively, are formed in a layer on the back-face side (lower layer side) of the reflector of the reflective area 21, and the reflectors are electrically isolated along the boundary between the reflective storage capacitance forming part and the transmissive storage capacitance forming part. This makes it possible to suppress generation of the offset voltage, so that the light leakage in the display of the pixel can be suppressed.

Figure 8:
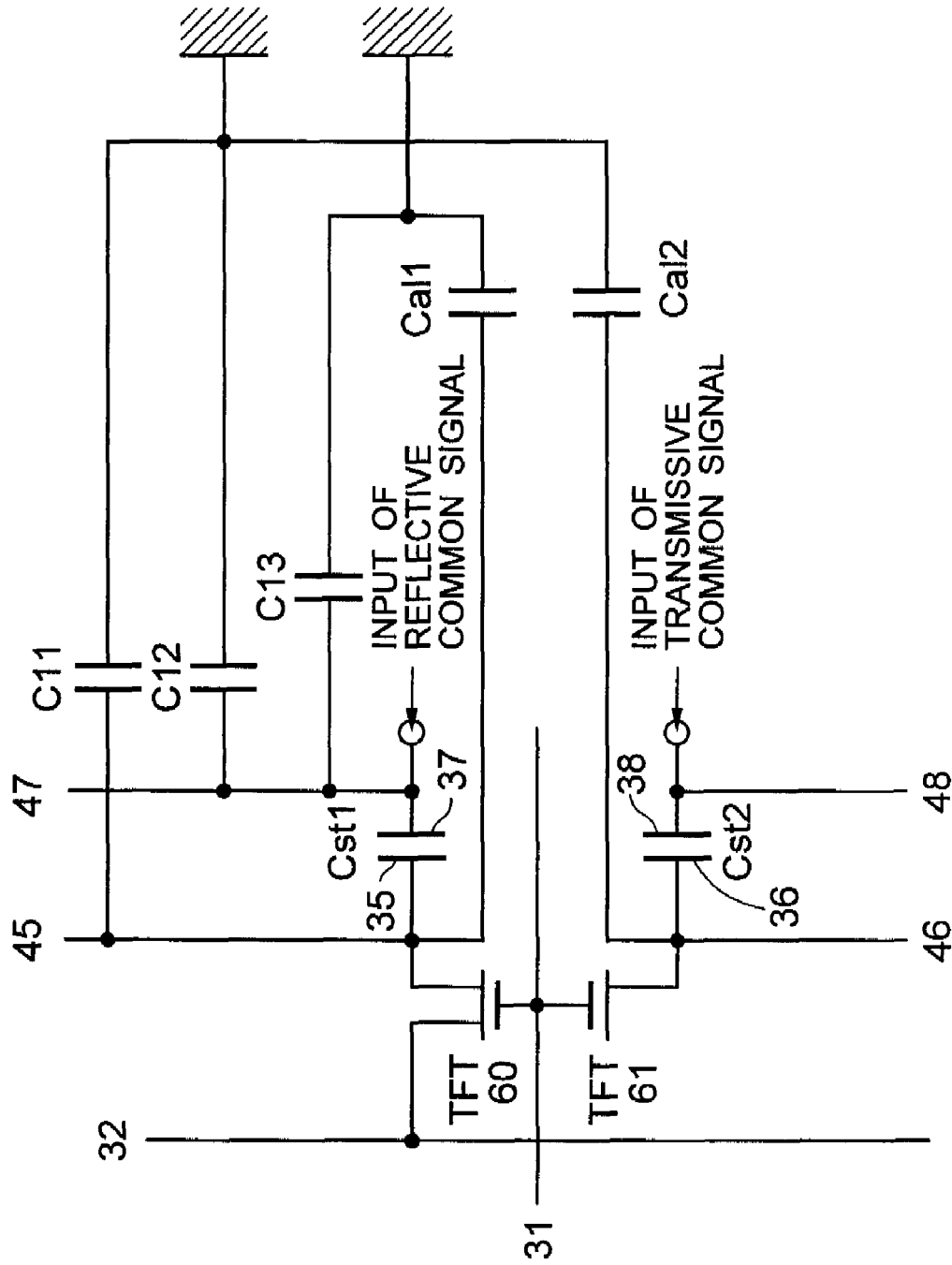
FIG. 8 is a plan circuit block diagram showing the constitution of the exemplary embodiment of the transflective liquid crystal display device disclosed in FIG. 1.

FIG. 8 shows an equivalent circuit on a TFT substrate within the unit pixel of the liquid crystal display device 10 that is shown in FIG. 1-FIG. 4. As shown in FIG. 8, the scanning line 31 as a control line for controlling the TFT (Thin Film Transistor) as the switching device and the data line 32 for supplying the pixel electrode voltage to the reflective and transmissive pixel electrodes via the TFT are formed to be in orthogonal to each other.

Here, TFTs 60 and 61 are formed by corresponding to the reflective area 21 and the transmissive area 22. Each gate of the TFTs 60 and 61 is connected to the scanning line 31, and either the sources or the drains thereof are connected to the data line 32. Further, each of the TFTs 60 and 61 has the other one (the source or the drain thereof) connected to the reflective pixel electrode A35 and the transmissive pixel electrode A36. As the switching device, other switching device than the TFT, such as MIM, may also be used.

As shown in FIG. 8, capacitance couplings C11, C12, and C13 (referred to as small capacitances) are generated between the reflector 23 and the reflective common electrode B47, between the reflector 24 and the reflective pixel electrode B45, and between the reflectors 23, 24 and the reflective common electrode B47, respectively. It is assumed here that the film thickness of the flattening film layer 15 in FIG. 1 is about five times as thick as the film thickness of the insulating film 12, and the area of the reflective common electrode B47 or the reflective pixel electrode B45 is about one tenth of the area of the electrodes that configure the storage capacitance. Accordingly, the size of the small capacitance becomes about one fiftieth of the storage capacitance to be formed. Therefore, when the driving voltage of the offset voltage supplied to the reflective pixel electrode and the transmissive pixel electrode is 5V, the voltage of the small capacitance is about 0.1V. This is smaller compared to the threshold voltage, so that it is considered uninfluential to the display.

Figure 9:
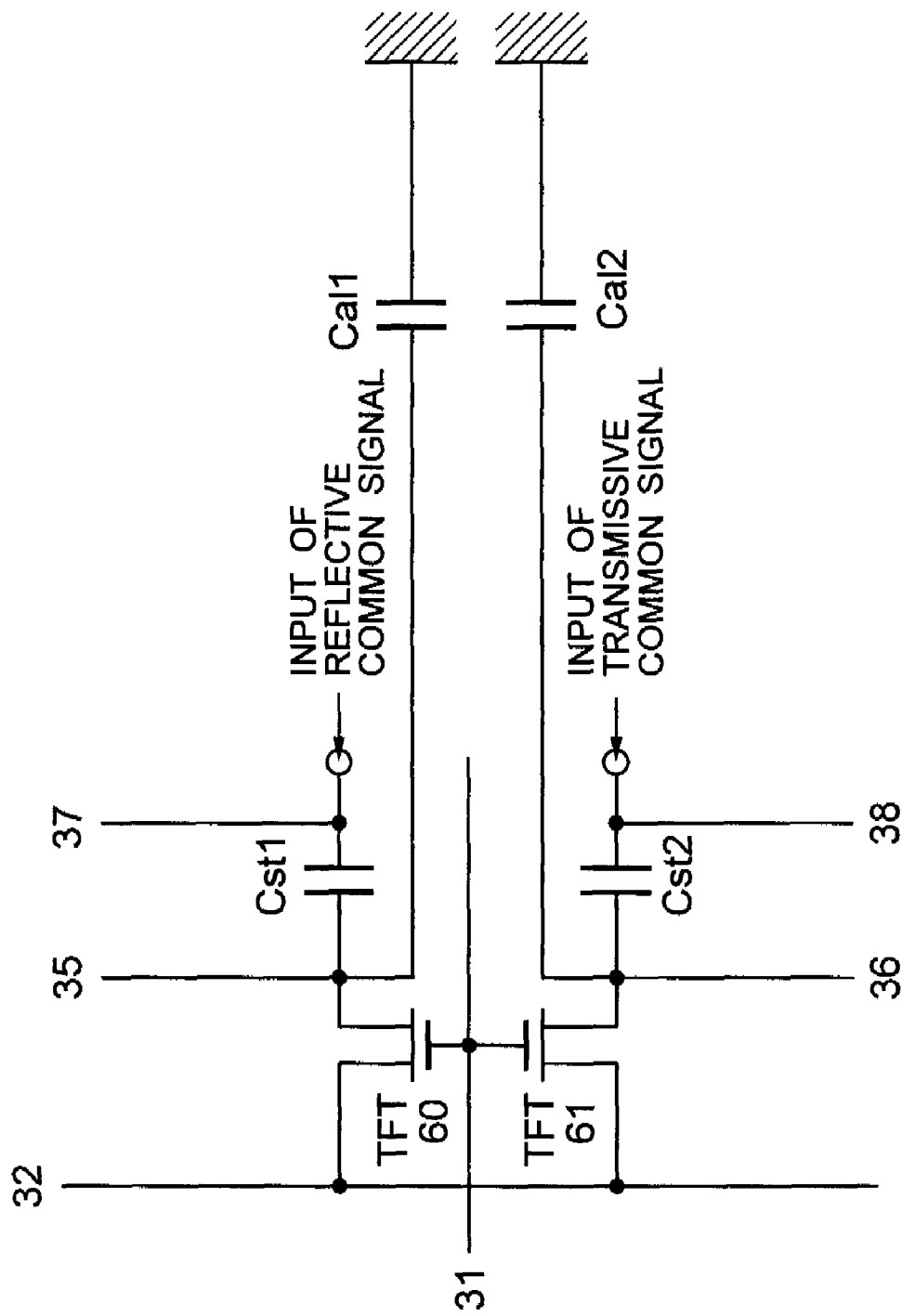
FIG. 9 is a schematic plan circuit block diagram showing the constitution of the exemplary embodiment of the transflective liquid crystal display device disclosed in FIG. 1.

FIG. 9 shows an equivalent circuit when the small capacitance is not taken into consideration. As shown in FIG. 9, the capacitance Cst1 and Cal1 of the reflective area 21 and the capacitances Cst2 and Cal2 of the transmissive area 22 are independent from each other. Therefore, even if the potential of the reflector 23 is changed due to the capacitance Cal1, for example, the potential of the transmissive pixel electrode A36 follows the transmissive common signal without being affected by the potential of the capacitance Cal1 because the reflector 24 is electrically isolated from the reflector 23. Thereby, the potential difference generated between the pixel electrode and the common electrode in the selected period of the scanning line 31 can be maintained also in the non-selected period. At the same time, it becomes possible to suppress generation of the offset voltage, so that the light leakage in the display of the pixel can be suppressed.

Second Exemplary Embodiment

Next, as a suppressing device according to a second exemplary embodiment of the invention, there will be described a case that utilizes a capacitance ratio between the storage capacitance of the reflective area and the capacitance formed between the static electrode and the reflector of the reflective area and utilizes a capacitance ratio between the storage capacitance of the transmissive area and the capacitance formed between the static electrode and the reflector of the transmissive area.

The suppressing device according to the second exemplary embodiment of the invention is structured to suppress the offset voltage to be smaller than the threshold voltage by utilizing the capacitance ratio between the storage capacitances Cst1 and the capacitance Cal1 of the reflective area 21 and the capacitance ratio between the storage capacitances Cst2 and the capacitance Cal2 of the transmissive area 22, considering that the liquid crystal layer 16 has a characteristic of causing a light leakage when an offset voltage exceeding the threshold value is applied. Hereinafter, the suppressing device according to the second exemplary embodiment of the invention will be described in a concretive manner.

For the liquid crystal display device according to the second exemplary embodiment of the invention, the same reference numerals are applied to the same components as those of the first exemplary embodiment described above. In the second exemplary embodiment, the system equipment part has almost the same structure as that of the first exemplary embodiment. It is different from the first exemplary embodiment in respect that a reflector 25 is provided instead of the electrically isolated reflectors 23 and 24 provided in the first exemplary embodiment.

Figure 10:
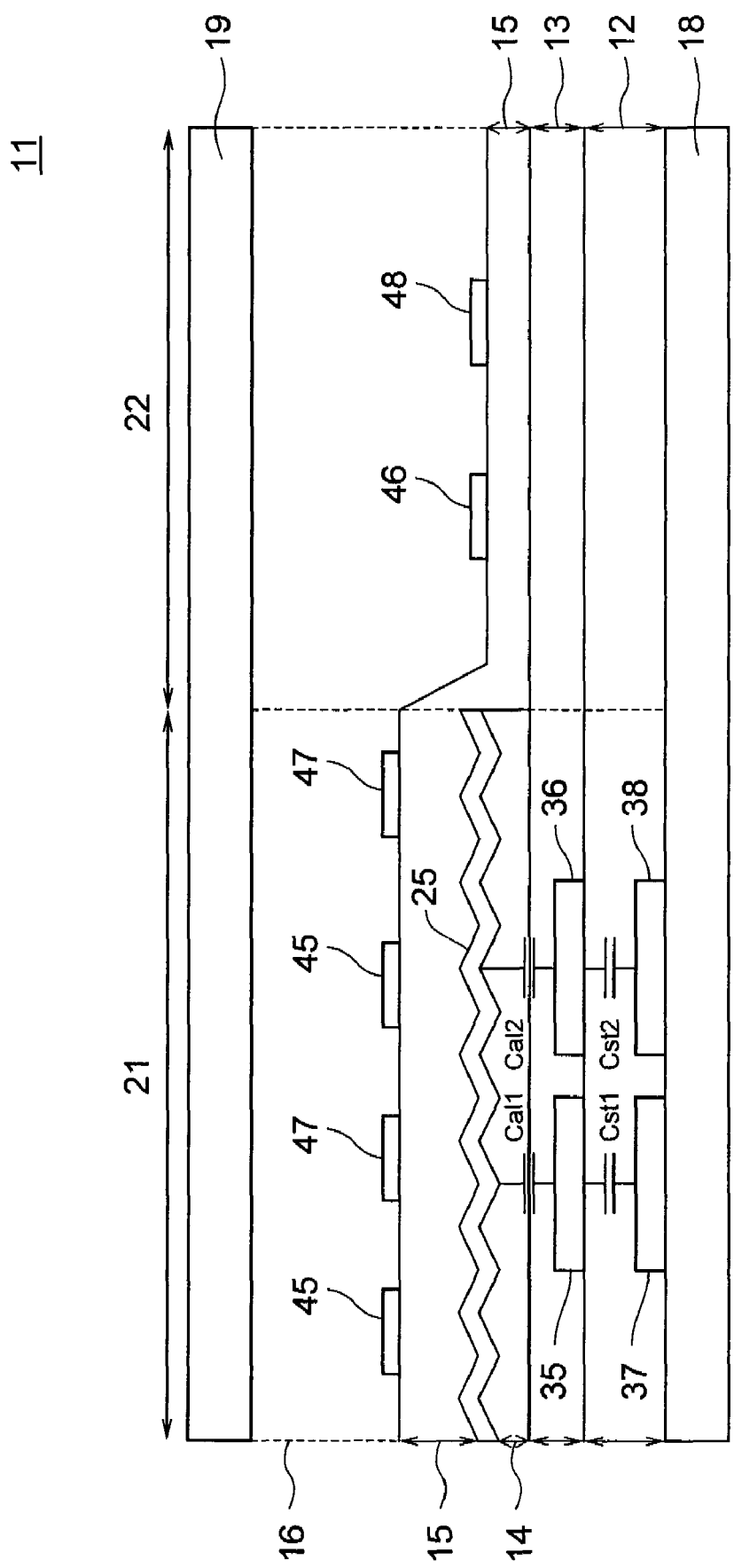
FIG. 10 is a sectional view showing a unit pixel structure of another exemplary embodiment of the transflective liquid crystal display device according to the invention.

As in the case of the first exemplary embodiment (FIG. 1) described above, a liquid crystal display device 11 according to the second exemplary embodiment includes a back-face side substrate 18 configured with a reflective area 21 and a transmissive area 22, and a reflective common electrode A37 and a transmissive common electrode A38 are formed on the reflective area 21 side on the viewer-side surface of the back-face side substrate 18, as shown in FIG. 10. Further, a scanning line 31 (as in the case of FIG. 2) is formed on the same plane where the reflective common electrode A37 and the transmissive common electrode A38 are formed. As in FIG. 2 of the first exemplary embodiment, the transmissive common electrode A38, the scanning line 31, and the reflective common electrode A37 are formed in parallel towards the direction away from the transmissive area side in order of the transmissive common electrode A38, the scanning line 31, and the reflective common electrode A37. Then, as shown in FIG. 10, an insulating layer 12 is formed on the viewer side of the back-face side substrate 18 by covering the transmissive common electrode A38 and the reflective common electrode A37.

Further, as shown in FIG. 10, a reflective pixel electrode A35 is formed to overlap with the reflective common electrode A37 on the viewer side of the reflective area 21 of the insulating layer 12. In other words, the reflective pixel electrode A35 is formed over the reflective common electrode A37 when viewed from the viewer side. Thereby, a reflective storage capacitance Cst1 with the reflective common electrode A37 is formed on the back-face side (within the insulating layer 12) of the reflective pixel electrode A35. Similarly, a transmissive pixel electrode A36 is formed to overlap with the transmissive common electrode A38 on the viewer side of the reflective area 21 of the insulating layer 12. Thereby, a transmissive storage capacitance Cst2 with the transmissive common electrode A38 is formed on the back-face side (within the insulating layer 12) of the transmissive pixel electrode A36.

Further, as in FIG. 2 of the first exemplary embodiment, a data line 32 to which data signals for each pixel are supplied is formed to cross with the transmissive pixel electrode A38, the scanning line 31, and the reflective common electrode A37 perpendicularly on the same plane where the reflective pixel electrode A35 and the transmissive pixel electrode A36 are formed. As shown in FIG. 2, there is formed a switching device (referred to as TFT hereinafter) for connecting protruded parts of each of the data line 32, the reflective pixel electrode A35, and the transmissive pixel electrode A36 mutually (a part circled with a dashed line). Further, as shown in FIG. 10, an insulating layer 13 is formed in the reflective area 21 and the transmissive area 22 by covering the viewer side of the insulating layer 12 including the reflective pixel electrode A35 and the transmissive pixel electrode A36 with an insulating layer.

Further, an organic film layer 14 is formed in the reflective area 21 on the viewer side of the insulating layer 13. The organic film layer 14 has, on the viewer-side face, an uneven pattern that fits to the reflector to be described later.

Figure 11:
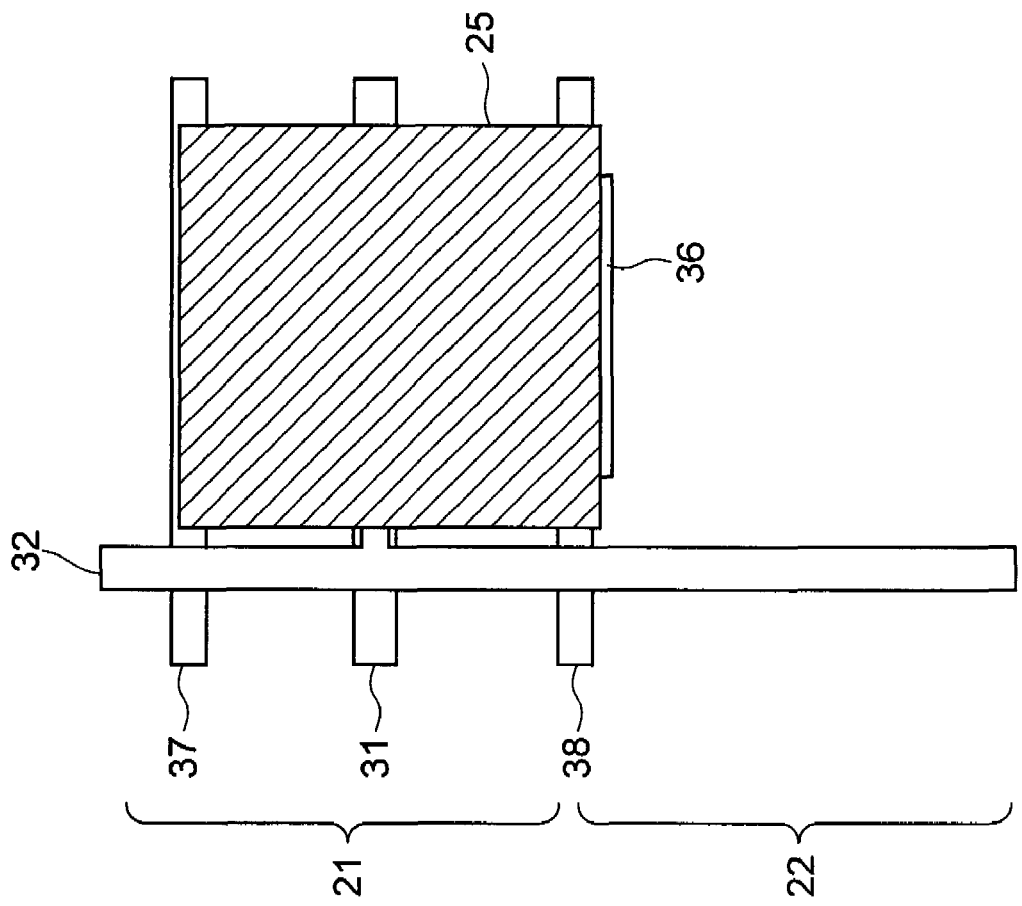
FIG. 11 is a plan view showing the structure of the exemplary embodiment of the transflective liquid crystal display device disclosed in FIG. 10.

Further, as shown in FIG. 10 and FIG. 11, a reflector 25 is formed to overlap with the reflective pixel electrode A35 and the transmissive pixel electrode A36 on the viewer-side face of the organic film layer 14. That is, the reflector 25 is arranged to be over the reflective pixel electrode A35 and the transmissive pixel electrode A36 when viewed from the viewer side. With this, the capacitances Cal1 and Cal2 are formed, respectively, between the back-face side of the reflector 25 and the reflective pixel electrode A35 as well as the transmissive pixel electrode A36 (interface between the insulating layer 13 and the organic film layer 14). Further, the reflector 25 is formed to have an uneven pattern on its cross section for increasing the scattering effect.

Further, as shown in FIG. 10, a flattening film layer 15 is formed by covering the viewer side of the reflector 25 of the reflective area 21 and the viewer side of the insulating layer 13 of the transmissive area 22 with a flattening film. By adjusting the thickness of the flattening film layer 15, cell gaps of each liquid crystal layer in the reflective area 21 and the transmissive area 22 can be adjusted.

Figure 12:
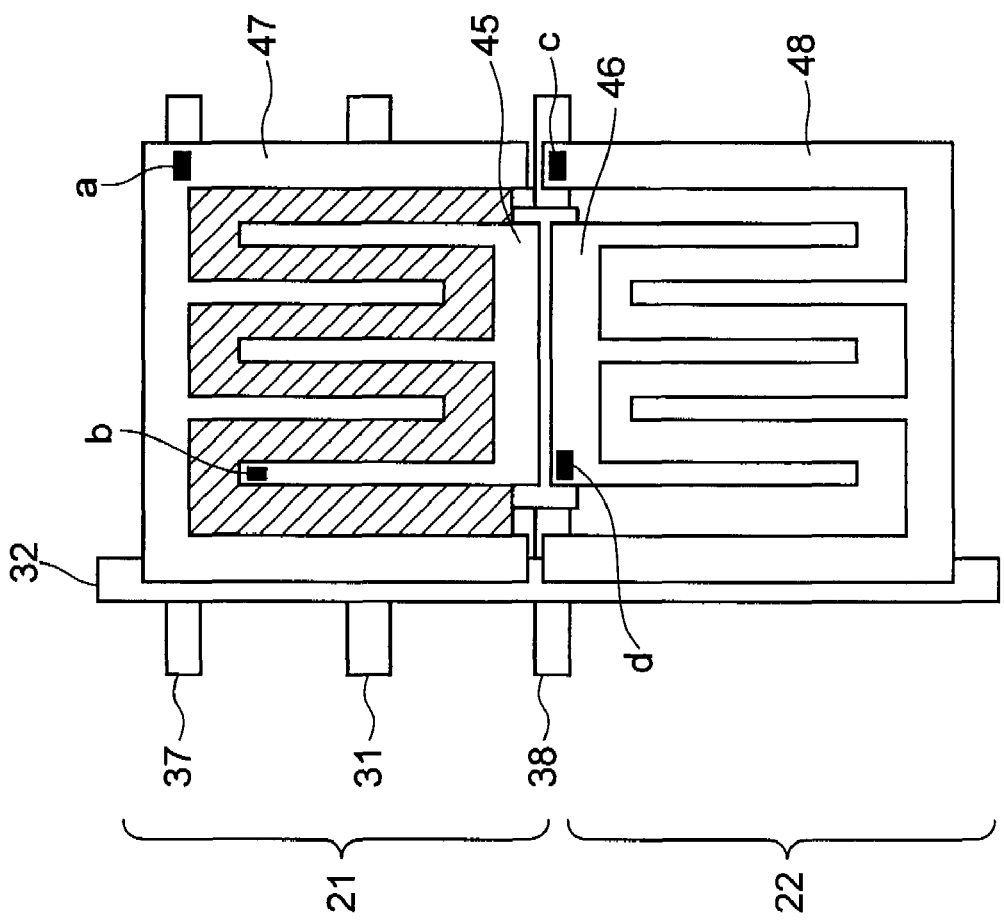
FIG. 12 is a plan view showing the structure of the exemplary embodiment of the transflective liquid crystal display device disclosed in FIG. 10.

Further, as shown in FIG. 12, a comb-like shape reflective common electrode B47 and a comb-like shape reflective pixel electrode B45 are arranged on the viewer-side face of the flattening film layer 15 in such a manner that the protruded parts of the respective electrodes face in the direction towards the inner side of the reflective area. Thereby, in the reflective area 21, the reflective pixel electrode B45 and the reflective common electrode B47 are arranged in an alternate manner in a direction orthogonal to the longitudinal direction of the comb teeth.

Similarly, a comb-like shape transmissive common electrode B48 and a comb-like shape transmissive pixel electrode B46 are arranged on the viewer-side face of the flattening film layer 15 of the transmissive area 22 in such a manner that the protrude parts of the respective electrodes face in the direction towards the inner side of the transmissive area. Thereby, in the transmissive area 22, the transmissive pixel electrode B46 and the transmissive common electrode B48 are arranged in an alternate manner in a direction orthogonal to the longitudinal direction of the comb teeth.

As shown in FIG. 12, the reflective common electrode B47, the reflective pixel electrode B45, the transmissive common electrode B48, and the transmissive pixel electrode B46 are connected to the reflective common electrode A37, the reflective pixel electrode A35, the transmissive common electrode A38, and the transmissive pixel electrode A36, respectively, via contact holes a-d formed in the reflective area 21 and the transmissive area 22.

Further, as shown in FIG. 10, the liquid crystal layer 16 is formed on an upper layer (viewer side) of the flattening film layer 15 by covering the reflective pixel electrode B45, the reflective common electrode B47, the transmissive pixel electrode B46, and the transmissive common electrode B48. Regarding the crystal layer 16, retardation $\Delta$nd thereof in the reflective area 21 is set as $\lambda/4$, and retardation $\Delta$nd thereof in the transmissive area 22 is set as $\lambda/2$. Further, a viewer-side substrate 19 is provided on the viewer side of the liquid crystal layer 16. Thereby, a unit pixel of the liquid crystal display device according to the exemplary embodiment is configured.

The liquid crystal display device of the exemplary embodiment is structured in the above-described manner, so that an electric field is generated between the reflective common electrode B47 and the reflective pixel electrode B45 and between the transmissive common electrode B48 and the transmissive pixel electrode B46 arranged on the upper layer (viewer side) of the flattening film 15 so as to rotationally drive the liquid crystal.

Figure 13:
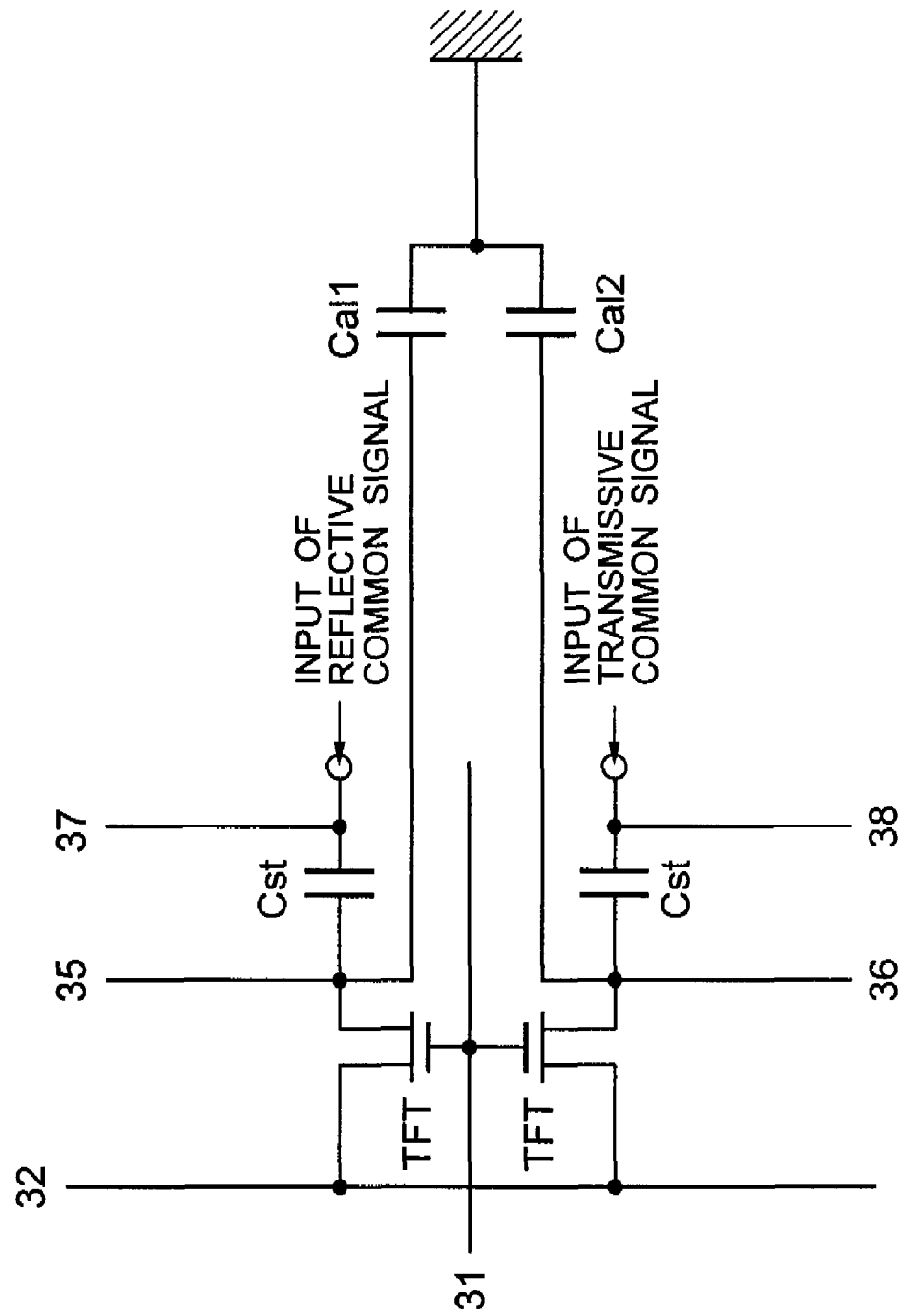
FIG. 13 is a schematic plan circuit block diagram showing the constitution of the exemplary embodiment of the transflective liquid crystal display device disclosed in FIG. 10.

FIG. 13 shows an equivalent circuit on a TFT substrate within the unit pixel of the liquid crystal display device 11 that is shown in FIG. 10-FIG. 12. As shown in FIG. 13, the scanning line 31 as a control line for controlling the TFT as the switching device and the data line 32 for supplying the pixel electrode voltage to the reflective and transmissive pixel electrodes via the TFT are formed to be in orthogonal to each other.

With this structure, provided that the capacitance value formed between the reflective and transmissive common electrodes and between the reflective and transmissive pixel electrodes is C1 (Cst), each capacitance value formed between the reflective pixel electrode A35 as well as the transmissive pixel electrode A36 and the reflector 25 is C2 (Cal), and $\alpha$ is C2/(C1+C2), the value of $\alpha$ and the potential difference V between the reflective common electrode A37 and the reflector 25 and between the transmissive common electrode A38 and the reflector 25 satisfy a relation of "0.5>V×$\alpha$".

Further, a capacitance value C3 formed between the reflective pixel electrode and the reflector and a reflective storage capacitance value C4 formed between the reflective pixel electrode and the reflective common electrode satisfy a relation of "3<C4/C3".

Furthermore, a capacitance value C5 formed between the transmissive pixel electrode and the reflector and a transmissive storage capacitance value C6 formed between the transmissive pixel electrode and the transmissive common electrode satisfy a relation of "3<C6/C5".

Figure 14A:
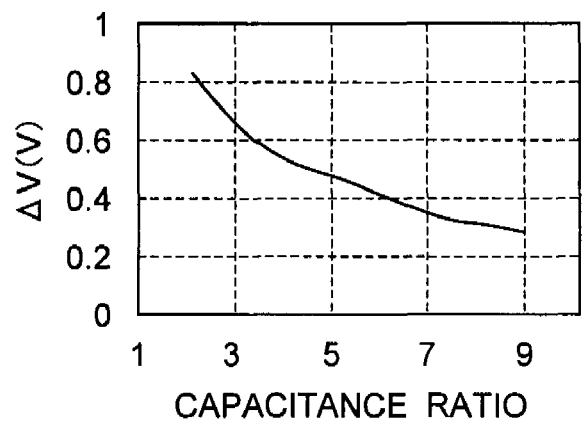

The storage capacitances Cst1 and Cst2 (generally referred to as "Cst" hereinafter) of the reflective area 21 and the transmissive area 22 are connected via the capacitances Cal1 and Cal 2 (generally referred to as "cal" hereinafter), so that there is an offset voltage generated mutually. FIG. 14A shows an example of the relation between the capacitance ratio regarding Cst and Cal (Cst/Cal) and the offset voltage ($\Delta V$) generated between the transmissive pixel electrode A36 and the transmissive common electrode A38. Based on that, the offset voltage ($\Delta V$) is suppressed as the value of Cst/Cal becomes increased.

Figure 14B:
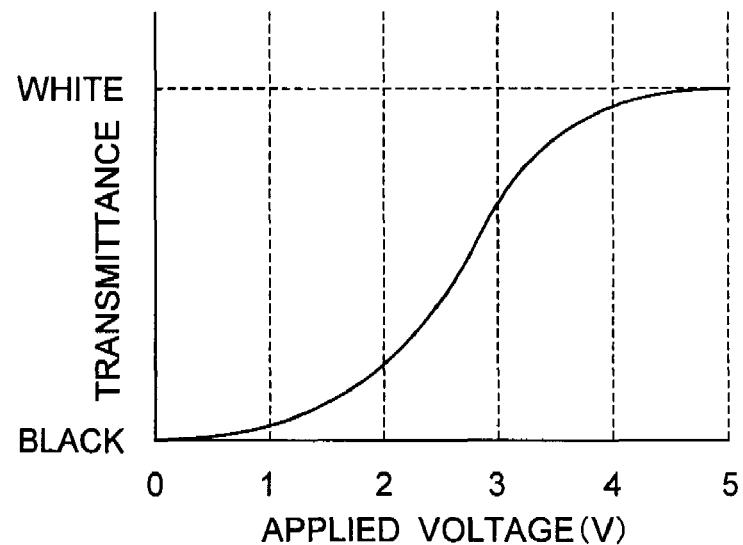

Further, FIG. 14B shows an example of a graph about the relation between the transmittance and the applied voltage. Here, the threshold voltage is about 0.7V. When the value of the ratio (Cst/Cal) between the capacitances (Cst and Cal) is set as 3 or larger, for example, "$\Delta V$" indicates a value of 0.7V or smaller. This is smaller than the threshold voltage set in advance, so that the light leakage in the transmissive area 22 can be suppressed.

As a way of example to increase the capacitance ratio (Cst/Cal), the film thickness of the organic film layer 14 may be increased. Specifically, it is assumed herein to have a pixel structure in which the insulating film layer 12 is formed with an SiO film (relative dielectric constant=4.0) in a film thickness of 0.15 μm and an SiN film (relative dielectric constant=6.4) in a film thickness of 0.3 μm, the insulating film layer 13 is formed with an SiN film in a film thickness of 0.15 μm, and the organic film layer 14 is formed with an acryl-based resin (relative dielectric constant=3.2).

Figure 14C:
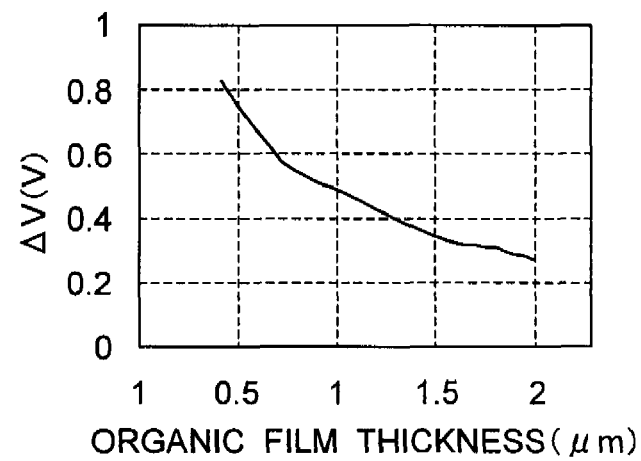

Thus, when the area of the reflector is twice the area of the electrodes forming each of the storage capacitances Cst1, Cst2 of the reflective and transmissive areas 21, 22, the film thickness of the organic film layer for making the offset voltage smaller than 0.7V (threshold voltage) is 0.5 μm or more based on the relation between the film thickness of the organic film layer and the offset voltage as shown in FIG. 14C. Thereby, the liquid crystal display device of the second exemplary embodiment is capable of suppressing the offset voltage and suppressing deterioration of the visibility caused by the light leakage, even with the structure where the reflector is not isolated electrically.

Third Exemplary Embodiment

Next, a case of utilizing changes in wirings as the suppressing device of the exemplary embodiment of the invention will be described as a third exemplary embodiment of the invention.

The suppressing device according to the third exemplary embodiment of the invention has a structure in which a scanning line 31 for supplying scanning signals to the unit pixel is isolated from the lower layers of the reflectors 23, 24, and 25 so that the electric field from the scanning line 31 can be arranged outside the area that affects the potentials of the reflectors 23, 24, and 25. Hereinafter, the third exemplary embodiment of the invention will be described in a concretive manner. The same reference numerals are applied to the same components as those of the first and second exemplary embodiments described above.

As shown in FIG. 15, the unit pixel structure of the third exemplary embodiment is different from the other exemplary embodiments in respect that a scanning line 31 is provided at an end part on the far side from the transmissive area 22 side, i.e. at the boundary between the unit pixel itself and the far side pixel from the transmissive area 22. In other words, the scanning line 31 is provided at a position that does not overlap with the reflector.

Further, a reflective common electrode A37 is disposed within the reflective area 21 on the same plane where the scanning line 31 is provided, and a transmissive common electrode A38 is disposed on the transmissive area 22 side from the reflective common electrode A37. Thereby, a TFT is also formed on the side where the scanning line 31 is provided. Other structures of this transflective liquid crystal display device are almost the same as those of the second exemplary embodiment described above.

As described, by providing the scanning line 31 on the far side (upper end) from the transmissive area of the unit pixel structure, i.e. by providing the scanning line 31 at a position that does not overlap with the reflector, influences of the electric field generated from the scanning line 31 to be imposed on the potential of the reflector can be suppressed.

In the reflective area of an IPS transflective liquid crystal display device, normally, there is a possibility that the electric field direction that is originally set to be horizontal to its substrate becomes disturbed due to shift or fluctuation generated in the potential to be applied to the reflector.

As described above, by arranging the scanning line 31 at the end part of the reflective area 21 where the reflector does not overlap with the scanning line 31 when viewed from the viewer side, the scanning line 31 does not go through the back-face side (lower layer side) of the reflector. This makes it possible to lighten the influences of the electric field generated from the scanning line 31 to be imposed on the potential of the reflector.

With this, the potential (electric field) can be applied to the liquid crystal layer of the reflective area 21 in a direction parallel to the substrate. Therefore, the contrast and visibility of the reflective area can be improved.

Fourth Exemplary Embodiment

Next, a case of arranging a part of the storage capacitance Cst2 of the transmissive area 22 outside the area of the lower layers of the reflectors 23, 24, and 25 as the suppressing device of the exemplary embodiment of the invention will be described as a fourth exemplary embodiment of the invention. The same reference numerals are applied to the same components as those of the first, second, and third exemplary embodiments described above.

As shown in FIG. 16, a unit pixel structure of the transflective liquid crystal display device according to the fourth exemplary embodiment of the invention has a part of the storage capacitance of the transmissive area 22 (specifically, a part of a transmissive pixel electrode 36a and transmissive common electrode 38a) arranged in an area that does not overlap with the reflectors 23, 24, and 25, i.e. outside the area of the reflectors 2, 24, and 25. In this exemplary embodiment, as shown in FIG. 16, a part of the transmissive common electrode A38 and transmissive pixel electrode A36 is provided at the end part within the transmissive area 22 on a far side from the reflective area 21 side (the part with slanting lines shown in FIG. 16). Thereby, a part of the storage capacitance of the transmissive area 22 is formed between the transmissive common electrode A38 and the transmissive pixel electrode A36 illustrated with the slanting lines.

As described above, the storage capacitances of the reflective area 21 and the transmissive area 22 of the first to third exemplary embodiments are provided on the lower layers of the reflectors at the positions to overlap with the reflectors. However, the fourth exemplary embodiment is different from the other exemplary embodiments in respect that a part of the storage capacitance of the transmissive area 22 is provided at a position that does not overlap with the reflector.

In this case, a structure for preventing the liquid crystal molecules from being inversely rotated can be provided to the transmissive common electrode and the transmissive pixel electrode arranged at the positions on the lower layer of the reflector, which do not overlap with the reflector. This makes it possible to suppress disclination in the upper end and the lower end of the transmissive area in particular, so that the visibility of the liquid crystal display device can be improved.

While the first to fourth exemplary embodiments have been described above by referring to a case of the IPS transflective liquid crystal display device, the invention is not limited only to such case. The invention can be applied to TN, VA, and FFS transflective liquid crystal display devices as well.

Next, another exemplary embodiment of the invention will be described. A transflective liquid crystal display device according to another exemplary embodiment of the invention is provided with a back-face side substrate, a viewer-side substrate, and a liquid crystal layer sandwiched between both substrates, and is configured with unit pixels (each including a reflective area for reflecting light from the viewer side and a transmissive area for transmitting light from the back-face side) which drive the liquid crystal layer. The transflective liquid crystal layer may be formed in a constitution in which: a pair of electrically isolated reflectors 1 and 2 are formed in the reflective area; a reflective pixel electrode and a transmissive pixel electrode each driven by data signals or a reflective common electrode and a transmissive common electrode driven by common signals for the reflective area and the transmissive area are provided on the back-face side substrate side of the reflectors 1 and 2; and a storage capacitance is formed, respectively, between the reflective pixel electrode and the transmissive pixel electrode and between the reflective common electrode and the transmissive common electrode.

Further, the transflective liquid crystal display device, which is provided with the back-face side substrate, the viewer-side substrate, and the liquid crystal layer sandwiched between both substrates, and is configured with unit pixels (each including a reflective area with a reflector for reflecting light from the viewer side and a transmissive area for transmitting light from the back-face side) for driving the liquid crystal layer, may be formed in a constitution in which: a reflective pixel electrode and a transmissive pixel electrode each driven by data signals are provided for the reflective area and the transmissive area on the back-face side substrate side of the reflectors; a reflective common electrode and a transmissive common electrode are provided on the back-face side substrate of the reflective and transmissive pixel electrodes for forming storage capacitances, respectively, with the reflective pixel electrode and the transmissive pixel electrode; and, provided that a capacitance value formed between the reflective and transmissive common electrodes as well as the reflective and transmissive pixel electrodes is C1, a capacitance value formed between the reflective and transmissive pixel electrodes and the reflectors is C2, and $\alpha$ is $C2/(C1+C2)$, the value of $\alpha$ and the potential difference V between the reflective and transmissive common electrodes and the reflectors satisfy a relation of "$0.5 > V \times \alpha$".

Furthermore, the transflective liquid crystal display device may be structured in such a manner that a capacitance value C3 formed between the reflective pixel electrode and the reflector and a reflective storage capacitance value C4 formed between the reflective pixel electrode and the reflective common electrode satisfy a relation of "$3 < C4/C3$", and a capacitance value C5 formed between the transmissive pixel electrode and the reflector and a transmissive storage capacitance value C6 formed between the transmissive pixel electrode and the transmissive common electrode satisfy a relation of "$3 < C6/C5$".

With this, the aperture ratio can be increased in the liquid crystal display of the reflective area and the transmissive area. At the same time, it is possible to suppress a light leakage in the liquid crystal part effectively, and to improve the contrast as well as the visibility.

Further, the scanning line for supplying scanning signals to each unit pixel may be arranged at an end part of the reflective area within the unit pixel on the far side from the transmissive area.

This makes it possible to suppress influences of the scanning line imposed upon the potential of the reflectors, so that the contrast and visibility in the reflective area can be improved.

Furthermore, a part of the transmissive pixel electrode and the transmissive common electrode may be provided at the end part of the transmissive area that does not overlap with the reflectors.

It is possible to improve the visibility of the transmissive area by providing a structure for suppressing disclination generated in the upper part and lower part of the transmissive area when the liquid crystal display is driven.

Further, as the mode for driving the liquid crystal layer of each unit pixel, any one of the modes selected from IPS (in-plane switching), FFS (field fringe switching), VA (vertically aligned), and TN (twisted nematic) may be used.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the claims.

INDUSTRIAL APPLICABILITY

The present invention can be preferably utilized for liquid crystal display devices of portable terminal devices such as portable telephones, game machines, digital cameras, and video cameras.

What is claimed is:

1. A transflective liquid crystal display device comprising: within a unit pixel, a reflective area having a pixel electrode and a common electrode as a pair and a reflector, and a transmissive area having a pixel electrode and a common electrode as a pair; and a liquid crystal layer provided to the reflective area and the transmissive area, the transflective liquid crystal display device further comprising:
  storage capacitances for the reflective area and the transmissive area provided in a lower layer of the reflector for changing a potential of the pixel electrode by following a potential of the common electrode; and
  a suppressing device for suppressing a light leakage that is generated in the liquid crystal layer when the pixel electrode is affected by a potential of the reflector due to a capacitance coupling generated between the reflector and the pixel electrode.

2. The transflective liquid crystal display device as claimed in claim 1, wherein the suppressing device has a structure in which a capacitance formed between a static electrode of the reflective area and the reflector and a capacitance formed between a static electrode of the transmissive area and the reflector are electrically isolated.

3. The transflective liquid crystal display device as claimed in claim 1, wherein:
  the liquid crystal layer has such a characteristic that a light leakage occurs in the transmissive area when an offset voltage exceeding a threshold value is applied; and
  the suppressing device is structured to suppress the offset voltage to be smaller than the threshold value by utilizing a capacitance ratio between the storage capacitance of the reflective area and the capacitance that is formed between the static electrode of the reflective area and the reflector and a capacitance ratio between the storage capacitance of the transmissive area and the capacitance that is formed between the static electrode of the transmissive area and the reflector.

4. The transflective liquid crystal display device as claimed in claim 3, wherein:
  provided that a value of the storage capacitances in the reflective area or the transmissive area is C1, a value of the storage capacitances formed between the static electrodes of the reflective area or the transmissive area and the reflector is C2, and $\alpha$ is $C2/(C1+C2)$, a value of $\alpha$ and a potential difference V between the reflector and the reflective common electrodes that are in pairs with the static electrodes of the reflective area or the transmissive area satisfy a relation of "$0.5 > V \times \alpha$".

5. The transflective liquid crystal display device as claimed in claim 3, wherein:
  a capacitance value C3 formed between the static electrode of the reflective area and the reflector and a storage capacitance value C4 of the reflective area satisfy a relation of "$3 < C4/C3$".

6. The transflective liquid crystal display device as claimed in claim 3, wherein:
  a capacitance value C5 formed between the static electrode of the transmissive area and the reflector and a storage capacitance value C6 of the transmissive area satisfy a relation of "$3 < C6/C5$".

7. The transflective liquid crystal display device as claimed in claim 1, wherein a scanning line for supplying a scanning signal to the unit pixel is isolated from a lower layer of the reflector to be arranged outside an area where an electric field from the scanning line affects the potential of the reflector.

8. The transflective liquid crystal display device as claimed in claim 1, wherein a part of the storage capacitance of the transmissive area is arranged outside an area of a lower layer of the reflector.

9. The transflective liquid crystal display device as claimed in claim 1, which is driven by a transverse electric field generated between the pixel electrode and the common electrode.

10. A transflective liquid crystal display device comprising: within a unit pixel, a reflective area having a pixel electrode and a common electrode as a pair and a reflector, and a transmissive area having a pixel electrode and a common electrode as a pair; and a liquid crystal layer provided to the reflective area and the transmissive area, the transflective liquid crystal display device further comprising:
  storage capacitances for the reflective area and the transmissive area provided in a lower layer of the reflector for changing a potential of the pixel electrode by following a potential of the common electrode; and
  a suppressing means for suppressing a light leakage that is generated in the liquid crystal layer when the pixel electrode is affected by a potential of the reflector due to capacitance coupling generated between the reflector and the pixel electrode.

* * * * *